US011023676B2

(12) United States Patent
Wright et al.

(10) Patent No.: US 11,023,676 B2
(45) Date of Patent: *Jun. 1, 2021

(54) SYSTEMS AND METHODS FOR DETECTING AND COORDINATING CHANGES IN LEXICAL ITEMS

(71) Applicant: AT&T INTELLECTUAL PROPERTY I, LP, Atlanta, GA (US)

(72) Inventors: Jeremy Wright, Berkeley Heights, NJ (US); Alicia Abella, Morristown, NJ (US); John Grothendieck, Highland Park, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1476 days.

This patent is subject to a terminal disclaimer.

(21) Appl. No.: 15/074,061

(22) Filed: Mar. 18, 2016

(65) Prior Publication Data

US 2016/0203122 A1     Jul. 14, 2016

Related U.S. Application Data

(63) Continuation of application No. 13/598,662, filed on Aug. 30, 2012, now Pat. No. 9,324,007, which is a (Continued)

(51) Int. Cl.
*G06N 5/00* (2006.01)
*G06N 5/02* (2006.01)
(Continued)

(52) U.S. Cl.
CPC ...... *G06F 40/242* (2020.01); *G06F 16/24568* (2019.01); *G06F 40/284* (2020.01);
(Continued)

(58) Field of Classification Search
CPC .. G06F 40/242; G06F 40/30; G06F 16/24568; G06K 9/6284
See application file for complete search history.

(56) References Cited

U.S. PATENT DOCUMENTS 5,890,103 A    3/1999 Carus
6,006,175 A    12/1999 Holzrichter
(Continued)

FOREIGN PATENT DOCUMENTS

EP    1705645 A2    10/2006

OTHER PUBLICATIONS

Grothendieck, J. , "Tracking Changes in Languaga", IEEE Transactions on Speech and Audio Proceedings, 13 (5):700-711 (2005)., 2005.
(Continued)

*Primary Examiner* — Ben M Rifkin

(57) ABSTRACT

Systems and methods for efficiently detecting and coordinating step changes, trends, cycles, and bursts affecting lexical items within data streams are provided. Data streams can be sourced from documents that can optionally be labeled with metadata. Changes can be grouped across lexical and/or metavalue vocabularies to summarize the changes that are synchronous in time. The methods described herein can be applied either retrospectively to a corpus of data or in a streaming mode.

18 Claims, 22 Drawing Sheets

Related U.S. Application Data continuation of application No. 12/325,157, filed on Nov. 29, 2008, now Pat. No. 8,271,422.

(51) Int. Cl.
  *G06F 40/284* (2020.01)
  *G06F 40/242* (2020.01)
  *G06F 16/2455* (2019.01)
  *G06F 40/30* (2020.01)
  *G06K 9/62* (2006.01)

(52) U.S. Cl.
  CPC ........... *G06F 40/30* (2020.01); *G06K 9/6284* (2013.01); *G06N 5/003* (2013.01); *G06N 5/022* (2013.01)

(56) References Cited

U.S. PATENT DOCUMENTS

| | | |
|---|---|---|
| 6,215,906 B1 | 4/2001 | Okada |
| 6,215,908 B1 | 4/2001 | Vavro et al. |
| 7,272,612 B2 | 9/2007 | Birdwell et al. |
| 2002/0032564 A1 | 3/2002 | Ehsani et al. |
| 2006/0212294 A1* | 9/2006 | Gorin .................. G10L 25/51 |
| | | 704/245 |
| 2006/0230012 A1* | 10/2006 | Ruvolo ................ G06F 16/337 |

OTHER PUBLICATIONS

Wright, et al., "CoCITe—Coordinating Changes in Text", IEEE, 24(1):15-29 (2012)., 2012.

Grothendieck, J., "Tracking Changes in Language", IEEE Transactions on Speech and Audio Processing, vol. 13, No. 5, p. 700-711, 2005.

Wright et al. "CoCITe—Coordinating Changes in Text", IEEE, 24(1):15-29 (2012).

* cited by examiner

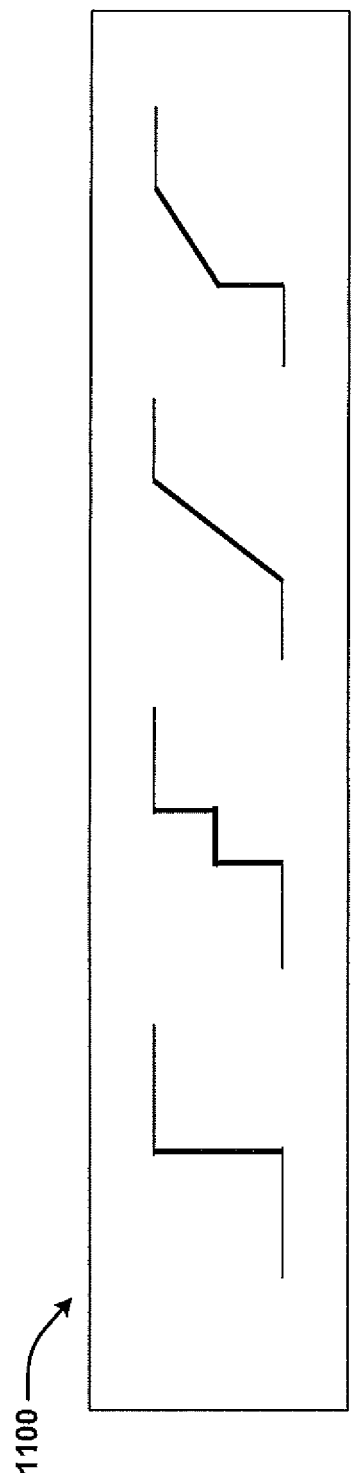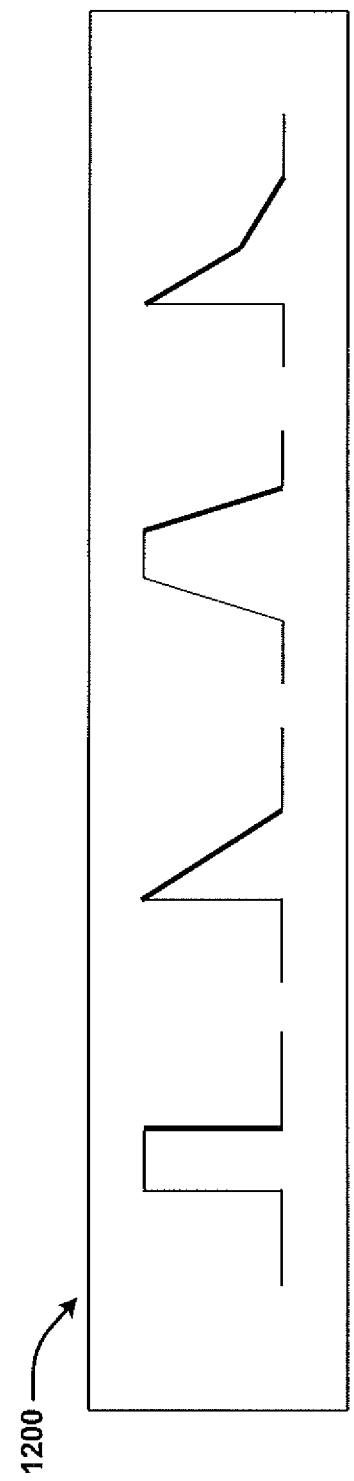

| Corpus | Words | Metavalues | Bins | Documents/bin | Time (CPU sec) |
|---|---|---|---|---|---|
| CHI Scan | 5000 | 55 | 90 | 46280 | 63 |
| Agent notes | 5000 | 51 | 153 | 22892 | 2300 |
| Search queries | 4886 | 1 | 174 (weekly) | 9791 | 1400 |
| Enron email | 19785 | 78 | 313 | 51 | 15600 |

FIG. 14

| Date | #Words | #States | Event |
|---|---|---|---|
| Sep04 | 53 | 30 | Payment with confirmation |
| Aug22 | 77 | 28 | Adjustment verification |
| Aug24 | 65 | 25 | VOIP offering |
| Sep01 | 22 | 8 | Internet service opportunity |
| Aug19 | 15 | 2 | Long-distance service verification |
| Aug31 | 29 | 2 | Hurricane Katrina |
| Aug12 | 17 | 2 | Payment mailed |
| Sep07 | 19 | 3 | Media presentation code |
| Sep03 | 11 | 1 | Calling card delivery |
| Aug13 | 11 | 2 | Directory assistance enquiry |

La, Ms
hurricane
Katrina
hurrican
house
affected
home
victim
destroyed
...

FIG. 17

| Event | Date | Terms |
|---|---|---|
| Comet Hale Bopp | 1997:Mar | halebopp, comet, hale, bopp |
| NASA Pathfinder | 1997:Jul | pathfinder, nasa, mars, jpl, mission |
| Princess Diana death | 1997:Sep | diana, princess, wales, lady, di, death, crash, funeral |
| Lewinsky affair | 1998:Jan,Sep | monica, lewinsky, lewinski |
| Star Wars film | 1999:May-Jun | star, wars, phantom, menace, episode |
| Solar eclipse | 1999:Aug | solar, eclipse, live |
| Hurricane Floyd | 1999:Sep | hurricane, floyd |
| Pfizer merger | 2000:Jun | pfizer, pharmaceuticals, merger, purchase, sale, news |
| Microsoft announcement | 2000:Jun | bill, gates |

FIG. 18

| Date | #Words | #Users | Events |
|---|---|---|---|
| Jun29-Jul07 | 92 | 2 | Serious IT issue |
| Dec09-Dec21 | 56 | 3 | Risk book reporting schedule, end-of-year purchases |
| Jul25-Jul27 | 28 | 1 | Transwestern contract approval request |
| Aug24-Sep01 | 56 | 1 | Project Tahiti transaction documents, Project Raptor, confidentiality notice, virus warning |
| Nov15-Dec01 | 32 | 2 | Year 2000 accomplishments list |
| Dec19-Dec28 | 59 | 2 | Wind and Powder River purchase contracts, Huber executed documents |
| Jun14-Jun28 | 21 | 2 | Capacity options on Transwestern |
| Oct24-Nov06 | 39 | 2 | Price caps, article on changing California power market, oil and gas price links |
| May19-Dec21 | 19 | 1 | User adds email signature |
| Nov20-Nov22 | 21 | 1 | Meeting with governor, article on future power supply |

FIG. 20

SYSTEMS AND METHODS FOR DETECTING AND COORDINATING CHANGES IN LEXICAL ITEMS

CROSS REFERENCE TO RELATED APPLICATION

This application is a continuation of U.S. patent application Ser. No. 13/598,662 filed Aug. 30, 2012 by Wright et al., entitled "Systems and Methods for Detecting and Coordinating Changes in Lexical Items" which is a continuation of U.S. patent application Ser. No. 12/325,157, filed Nov. 29, 2008, now U.S. Pat. No. 8,271,422. All sections of the aforementioned applications are incorporated herein by reference in their entirety.

TECHNICAL FIELD

The present disclosure relates generally to identifying trends in a data set and, more particularly, to systems and methods for detecting and coordinating changes in lexical items.

BACKGROUND

Text streams are ubiquitous and contain a wealth of information, but are typically orders of magnitude too large in scale for comprehensive human inspection. Organizations often collect voluminous corpora of data continuously over time. The data may be, for example, email messages, transcriptions of customer comments or of phone conversations, recordings of phone conversations, medical records, newsfeeds, or the like. Analysts in an organization may wish to learn about the contents of the data and the changes that occur over time, including when and why, such that they may understand and/or act upon the information contained within the data. Because of the large volume of data, reading each document in the corpora of data individually to determine the changes and summarize the contents can be expensive as well as difficult or impossible.

SUMMARY

The present disclosure describes systems and methods for efficiently detecting step changes, trends, cycles, and bursts affecting lexical items within one or more data streams. The data stream can be a text stream that includes, for example, documents and can optionally be labeled with metadata. These changes can be grouped across lexical and/or metavalue vocabularies to summarize the changes that are synchronous in time. A lexical item can include a single word, a set of words, symbols, numbers, dates, places, named-entities, URLs, textual data, multimedia data, other tokens, and the like. A metavalue can include information about incoming text or other incoming data. Metadata can be external metadata or internal metadata. External metadata can include facts about the source of the document. Internal metadata can include labels inferred from the content. Examples of metavalues include, but are not limited to, information about the source, geographic location, current event data, data type, telecommunications subscriber account data, and the like.

In one embodiment of the present disclosure, a method for efficiently detecting and coordinating change events in data streams can include receiving a data stream. The data stream can include various lexical items and one or more metavalues associated therewith. The method can further include monitoring a probability of occurrence of the lexical items in the data stream over time according to a lexical occurrence model to detect a plurality of change events in the data stream. The method can further include applying a significance test and an interestingness test. The significance test can be used to determine if the change events are statistically significant. The interestingness test can be used to determine if the change events are likely to be of interest to a user. The interestingness test can be defined using conditional mutual information between the lexical items and the lexical occurrence model given a time span to determine the amount of information that is derived from the change event. The method can further include grouping the change events across the lexical items and the metavalue to summarize the change events that are synchronous in time. The method can further include presenting, via an output device, a summarization of the grouped change events to the user.

In some embodiments, the change events are step changes, trends, cycles, or bursts in the data stream.

In some embodiments, the lexical occurrence model is a piecewise-constant lexical model, for example, based upon a Poisson or other distribution. In other embodiments, the lexical occurrence model is a piecewise-linear lexical model, for example, based upon a Poisson or other distribution. In still other embodiments, the lexical occurrence model includes a piecewise-linear component and periodic component to detect the change events in the data stream for recent data and long-span data, respectively.

In some embodiments, the interestingness test can be defined by the relationship:

$$I(W:M|T)=H(W|T)-H(W|M,T)$$

to determine the amount of information that is derived from the change event.

In some embodiments, the method can further include applying the monitoring step in a stream analysis mode. In a stream analysis mode, the lexical occurrence model includes a slowly-evolving periodic component for modeling regular cyclic changes, together with a piecewise-linear component for modeling irregular acyclic changes that may occur over either long or short timescales.

According to another embodiment of the present disclosure, a computer readable medium can include computer readable instructions that, when executed, perform the steps of the aforementioned method.

According to another embodiment of the present disclosure, a computing system for detecting and coordinating change events in data streams can include a processor, an output device, and a memory in communication with the processor. The memory can be configured to store instructions, executable by the processor to perform the steps of the aforementioned method.

BRIEF DESCRIPTION OF THE DRAWINGS

FIG. 11 is an exemplary graph of several profiles that show various exemplary types of step events, each with an onset phase shown in bold including one or more change-points, according to the present disclosure.

FIG. 12 is an exemplary graph of several profiles that show various exemplary types of burst events, each with an offset phase shown in bold including the onset phase, according to the present disclosure.

FIG. 14 is an exemplary table summarizing results obtained by applying a CoCITe method to various corpora, according to the present disclosure.

FIG. 17 is an exemplary table illustrating the top ten clusters including a start date, the number of words, and the metavalues (states) in each cluster for a plurality of events, according to the present disclosure.

FIG. 18 is an exemplary table illustrating search query data burst events, according to the present disclosure.

FIG. 20 is an exemplary table illustrating event clusters for Enron in the year 2000, according to the present disclosure.

DETAILED DESCRIPTION

Figure 1:
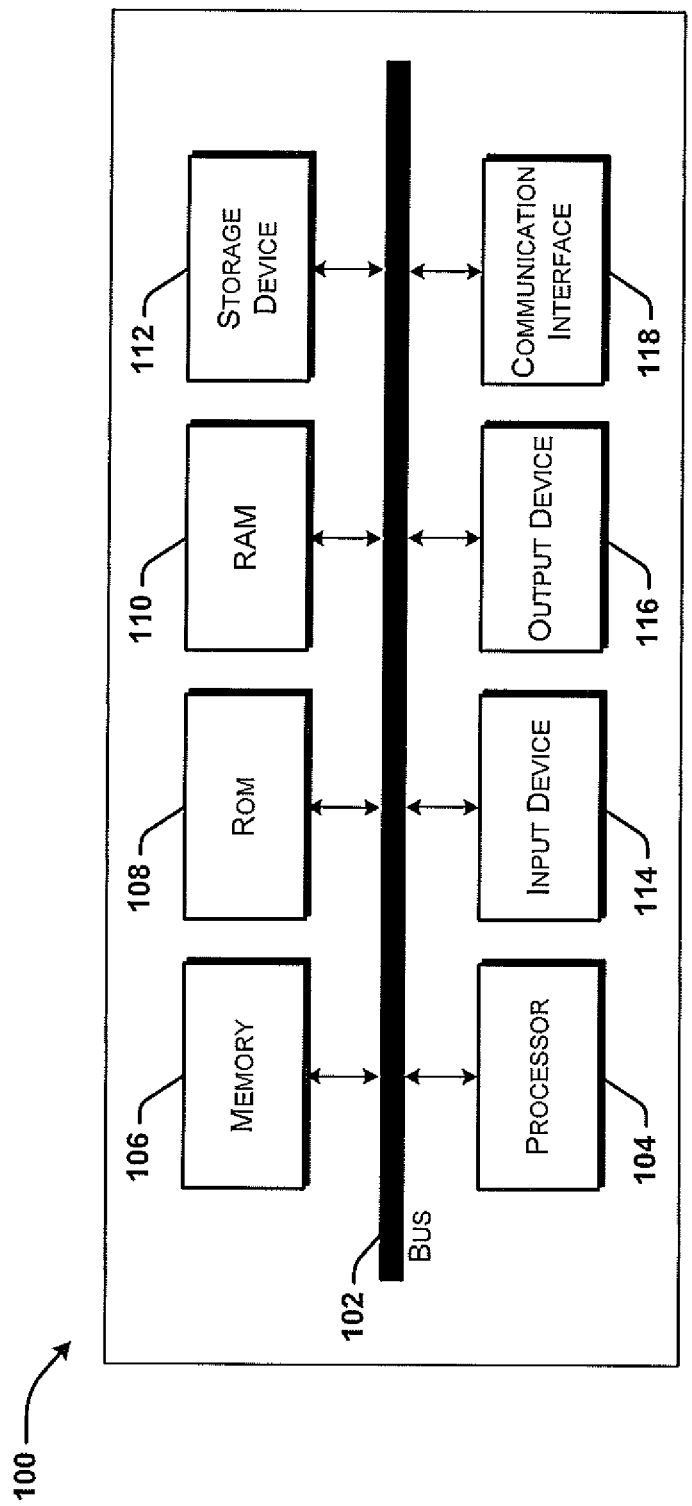
FIG. 1 schematically illustrates a computing system for use in accordance with various exemplary embodiments of the present disclosure.

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

By way of example and not limitation, consider a flow of text in the form of a stream of documents, each labeled with a time stamp and optionally with metadata, for example, the values of zero or more metavariables of the source. Each document can contain a set of words. The analysis described herein is also applicable to more general lexical items, such as, for example, phrases and non-local conjunctions. Given the enormous volumes of text currently being acquired and stored in many domains, it is impractical for human analysts to scan these volumes in order to find and summarize the important changes that are occurring, especially in a timely manner. Accordingly, the present disclosure provides systems and methods for detecting changes in frequency of occurrence of lexical items, either overall or for particular metavalues, localizing these changes in time, and coordinating changes that are synchronous in time across both lexical and metavalue vocabularies into higher-order events.

The present disclosure approaches the term "event" from a statistical view as would be understood by one skilled in the art. The output of a system according to the present disclosure can be a set of ranked groups, each of which can include one or more sets of lexical items and metavalues together with a description of the timing of the event, which can be a step, trend, cycle, burst, or the like. It is contemplated that the system output can be accompanied by original versions of documents that can be presented to an analyst for inspection.

Aspects of the present disclosure can be applied to documents of any length, although accuracy has been found to increase for documents that are relatively short. Documents can be divided into smaller documents, paragraph by paragraph, sentence by sentence, word by word, or character by character, for example. Some exemplary documents include:

search queries;

instant messages;

text messages;

customer care data, such as, but not limited to human-machine dialogues (e.g., Interactive Voice Response (IVR) system call logs), notes made by customer care agents, customer emails;

billing data;

medical records;

emergency room admissions data;

network traffic data, such as, but not limited to, normal traffic data, peak traffic data, and sub-normal traffic data;

malicious network activity, such as, but not limited to, botnet activity, malicious software activity, and the like; and network attack activity, such as, but not limited to, eavesdropping activity, data modification activity, identity spoofing activity, IP address spoofing activity, password-based attacks, denial-of-service attacks, man-in-the-middle attacks, compromised-key attacks, sniffer attacks, and application-layer attacks.

Metadata, if available, is valuable in several respects. Changes are often concentrated in sub-streams of the text flow characterized by particular metavalues. Hence, performing change-detection for individual metavalues or groups thereof focuses the search where necessary and avoids dilution. In addition, distinct groups of changes often overlap in time and share words or metavalues. Also, availability of metadata helps the coordination of changes into distinct events and avoids confusion. From an analyst's perspective, having a change-event labeled with a metavalue or group of metavalues helps to contextualize the change-event and aids in understanding the change-event.

The potential disadvantages of using sub-streams are a loss of power after separating the data into sub-streams for analysis, and additional computational burden. To alleviate these disadvantages, the present disclosure can impose a size limit on the metavalue vocabulary, for example, by grouping metavalues to reduce computational burden. Size limitations, if needed, can depend on the data set and the computational resources available. A metavalue vocabulary size on the order of tens can be preferable to one on the order of hundreds.

Conventional statistical tools can test two predetermined time intervals for whether the frequency of a given lexical item changed. In one embodiment of the present disclosure, neither the time intervals nor the number of changes are predetermined. In one embodiment of the present disclosure, the occurrences of the lexical item in a given text stream are modeled by a Poisson process, and changes are expressed in terms of the intensity of this process. The present disclosure can be fit to other models, such as, but not limited to, processes described by generalized Poisson distributions, binomial distributions, or negative binomial distributions.

The present disclosure provides systems and methods for detecting and coordinating changes of lexical items in the following exemplary respects:

The lexical vocabulary is not prescribed, although it can be seeded with items of particular interest.

Multiple change-points for each lexical item can be detected using a dynamic programming algorithm that ensures optimality.

The Poisson intensity parameter is assumed to be piecewise-linear. In addition to step changes, this allows the event occurrence rate to trend upwards or downwards in between the change-points.

A multi-phase periodic modulation can be superimposed on the intensity. This allows for regular (e.g., weekly) cycles, and avoids the redundant discovery of these as change-points.

A measure of interestingness is introduced. This weights each change-point by how much information it provides, and complements the more conventional measure of statistical significance.

Metadata are expressly incorporated into the analyst.

Individual atomic changes affecting word/metavalue combinations are grouped together where these are likely to arise from a common cause. This provides a structured output that is easier for a human analyst to assess.

Referring now to the drawings wherein like numerals represent like elements throughout the drawings, FIG. 1 illustrates an exemplary computing system 100 with which the present disclosure can be implemented. The illustrated system 100 includes a system bus 102 that couples various system components including a processor 104, a system memory 106, a read only memory (ROM) 108, and a random access memory (RAM) 110 to the processor 104. Other system memory can be available for use as well. It can be appreciated that the present disclosure can operate on a computing system with more than one processor 104 or on a group or cluster of computing systems networked together to provide greater processing capability. The system bus 102 can be any of several types of bus structures including a memory bus or memory controller, a peripheral bus, and a local bus using any of a variety of bus architectures. A basic input/output (BIOS), containing the basic routine that helps to transfer information between elements within the computing system 100, such as during start-up, is typically stored in ROM 108. The illustrated computing system 100 further includes a storage device 112, such as a hard disk drive, a magnetic disk drive, an optical disk drive, tape drive, or the like. The storage device 112 is connected to the system bus 102 by a drive interface. The drives and the associated computer readable media provide nonvolatile storage of computer readable instructions, data structures, program modules, and other data for the computing system 100. The basic components are known to those of skill in the art and appropriate variations are contemplated depending on the type of system, such as whether the system is a small, handheld computing device, a desktop computer, a computer server, a network cluster, and the like.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, RAMs, ROMs, a cable or wireless signal containing a bit stream and the like, can also be used in the exemplary operating environment.

To enable user interaction with the computing system 100, an input device 114 represents any number of input mechanisms, such as a microphone for speech, a touch-sensitive screen for gesture or graphical input, keyboard, mouse, motion input, and the like. An output device 116 can also be one or more of a number of output means, such as a display, monitor, projector, touch screen, multi-touch screen, or other output device capable of presenting results data to an analyst in a visual manner.

In some instances, multimodal systems enable a user to provide multiple types of input to communicate with the computing system 100. A communications interface 118 generally governs and manages the user input and system output. There is no restriction on the present disclosure operating on any particular hardware arrangement and therefore the basic features here may be substituted, removed, added to, or otherwise modified for improved hardware or firmware arrangements as they are developed.

Figure 2:
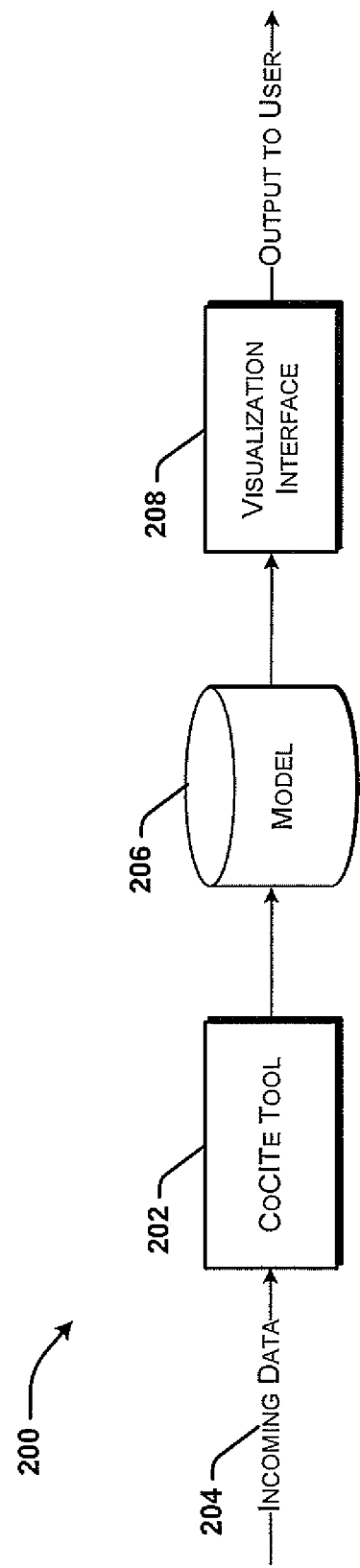
FIG. 2 schematically illustrates a system architecture for implementing a CoCITe (Coordinating Changes In Text) tool in a retrospective analysis mode of operation in accordance with an exemplary embodiment of the present disclosure.

Referring now to FIG. 2, a system architecture 200 for implementing a CoCITe (Coordinating Changes In Text) tool in a retrospective analysis mode of operation is illustrated in accordance with an exemplary embodiment of the present disclosure. The illustrated system architecture 200 includes a CoCITe tool 202 that can be configured to operate in a retrospective analysis mode. In an exemplary embodiment, a corpus of data 204 is received at the CoCITe tool 202, analyzed over a specified period of time according to a lexical occurrence model 206, output to a visualization interface 208 (realized via one or more output devices 116), and presented to an end user, such as an analyst, in a graph, plot, table, or other visualization. In the retrospective analysis mode, all modeling and visualization covers the specified period of time.

Figure 3:
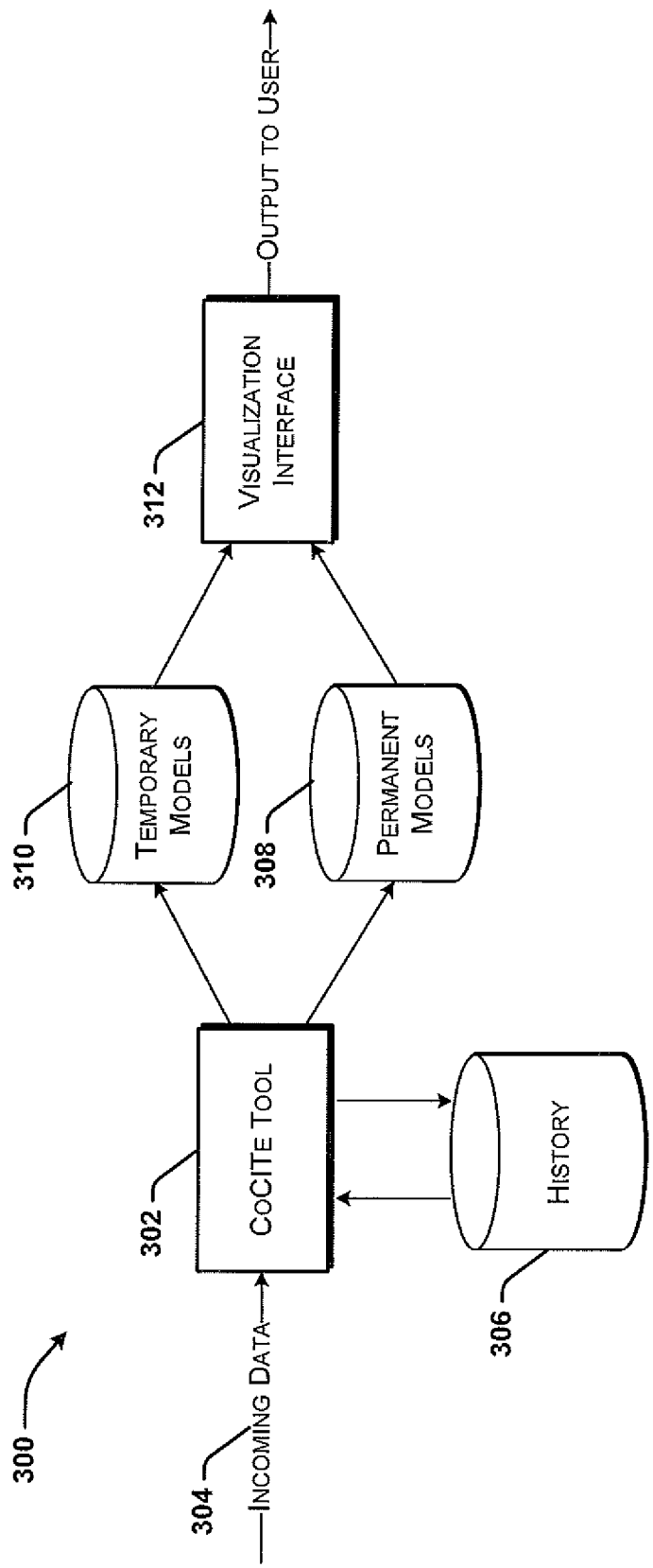
FIG. 3 schematically illustrates a system architecture for implementing a CoCITe tool in a stream analysis mode of operation in accordance with an exemplary embodiment of the present disclosure.

Referring now to FIG. 3, a system architecture 300 for implementing a CoCITe tool 302 in a stream analysis mode of operation is illustrated in accordance with an exemplary embodiment of the present disclosure. The illustrated system architecture 300 includes a CoCITe tool 302 that can be configured to operate in a stream analysis mode. In an exemplary embodiment, a corpus of data 304 is received at the CoCITe tool 302 and analyzed together with a history file 306. A new history file 306 can be generated together with the output of the change-detection algorithms described herein. The history file 306 can include past data that is useful for future analyses to create future training models in conjunction with new data. The history file 306 does not grow without bound because model segments are regularly transitioned to permanent status and the history file 306 is updated accordingly. As the time span lengthens, the first segment of the fitted model eventually becomes permanent and the start point moves forward to the end of that segment. Both temporary and permanent models go into the visualization covering any time-span.

In the stream analysis mode, the CoCITe tool 302 can create permanent segments (permanent models 308) of the lexical occurrence model from temporary models 310 as the span of incoming data moves forward in time. Accordingly, the CoCITe tool 302 can receive data on an on-going basis, analyze the data, output results to a visualization interface 312 (realized via one or more output devices 116), and presented to an end user, such as an analyst, in a graph, plot, table, or other visualization. In the stream analysis mode, new data arrives on an on-going basis, existing models are extended and updated, and an arbitrary time-span can be used for visualization.

The stream analysis mode improves efficiency over the retrospective analysis mode because earlier data is already pre-processed for model training and new data can be added expeditiously. The stream analysis mode also decouples optimization of model components. The periodic component changes slowly and the model is thereby trained using smoothed data from a long time-span. The piecewise-linear component may change quickly and the model is thereby trained using fully-detailed recent data.

Figure 4:
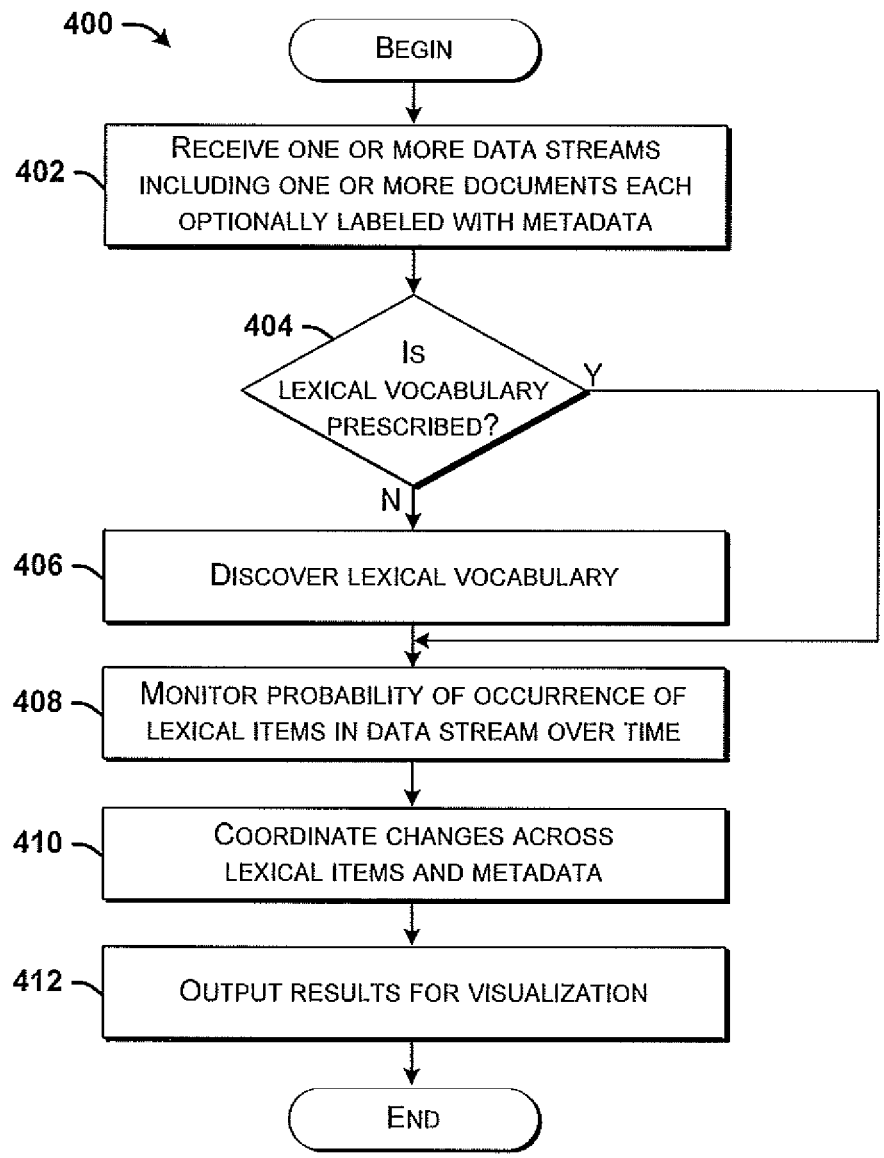
FIG. 4 schematically illustrates a method for operating a CoCITe tool in accordance with an exemplary embodiment of the present disclosure.

Referring now to FIG. 4, a method 400 for operating a CoCITe tool 202, 302 is illustrated, according to an exemplary embodiment of the present disclosure. It should be understood that the illustrated method 400 can be performed by a CoCITe tool 202, 302 operating in a retrospective analysis mode or a stream analysis mode as described above. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. Some or all steps of this process, and/or substantially equivalent steps, can be performed by execution of computer-readable instructions included on a computer readable medium.

The method 400 begins and flow proceeds to block 402 wherein one or more data streams including one or more documents each optionally labeled with metadata are received at the CoCITe tool 202, 302. It should be understood that the use of the term "documents" here is merely exemplary and the data stream can alternatively include raw or unformatted text, or other lexical items. Flow can proceed to block 404 wherein a determination is made as to whether a lexical vocabulary is prescribed. If a lexical vocabulary is not prescribed, flow can proceed to block 406 wherein a lexical vocabulary can be discovered. Flow can then proceed to block 408 wherein the probability of occurrence of lexical items in the incoming data streams over time is monitored. If a lexical vocabulary is prescribed, flow can proceed directly to block 408. At block 410, changes can be coordinated across lexical items and metadata. Flow can then proceed to block 412 wherein results can be output for visualization in the form of a graph, plot, table, or other visualization. The method can end.

Figure 5:
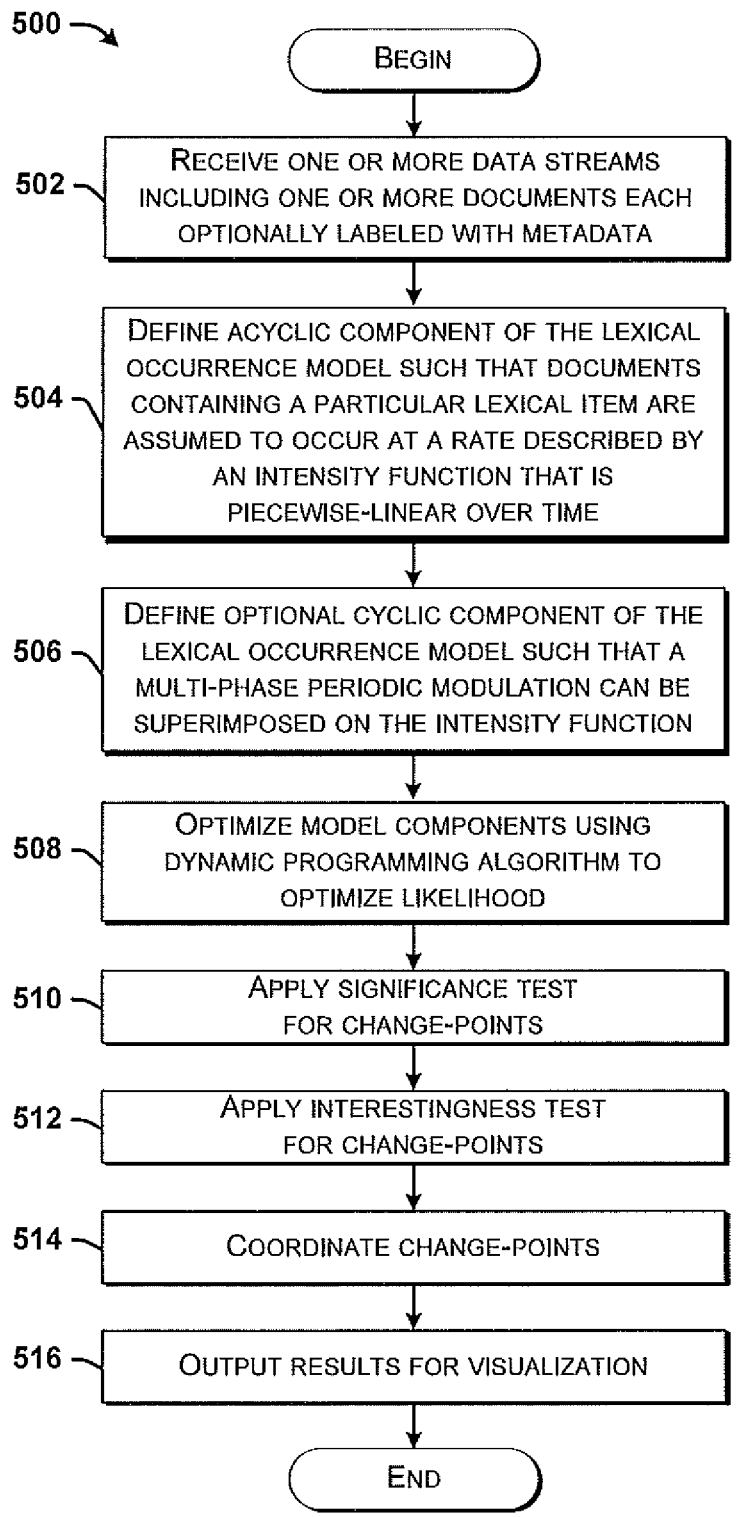
FIG. 5 schematically illustrates a method for operating a CoCITe tool in accordance with another exemplary embodiment of the present disclosure.

Referring now to FIG. 5, a method 500 for operating a CoCITe tool 202, 302 is illustrated, according to another exemplary embodiment of the present disclosure. It should be understood that the illustrated method 500 can be performed by a CoCITe tool 202, 302 operating in a retrospective analysis mode or a stream analysis mode as described above. It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. Some or all steps of this process, and/or substantially equivalent steps, can be performed by execution of computer-readable instructions included on a computer readable medium.

The method 500 begins and flow proceeds to block 502 wherein one or more data streams including one or more documents each optionally labeled with metadata can be received at the CoCITe tool 202, 302. At block 504, an acyclic component of the lexical occurrence model can be defined such that documents containing a particular lexical item are assumed to occur at a rate described by an intensity function that is piecewise-linear over time. For example, a Poisson distribution model or other distribution models can be used. Each linear piece of the model is referred to herein as a segment. There is no prescribed number of segments. The acyclic component can be used to model step changes, trends, and bursts in the incoming lexical items.

Figure 6:
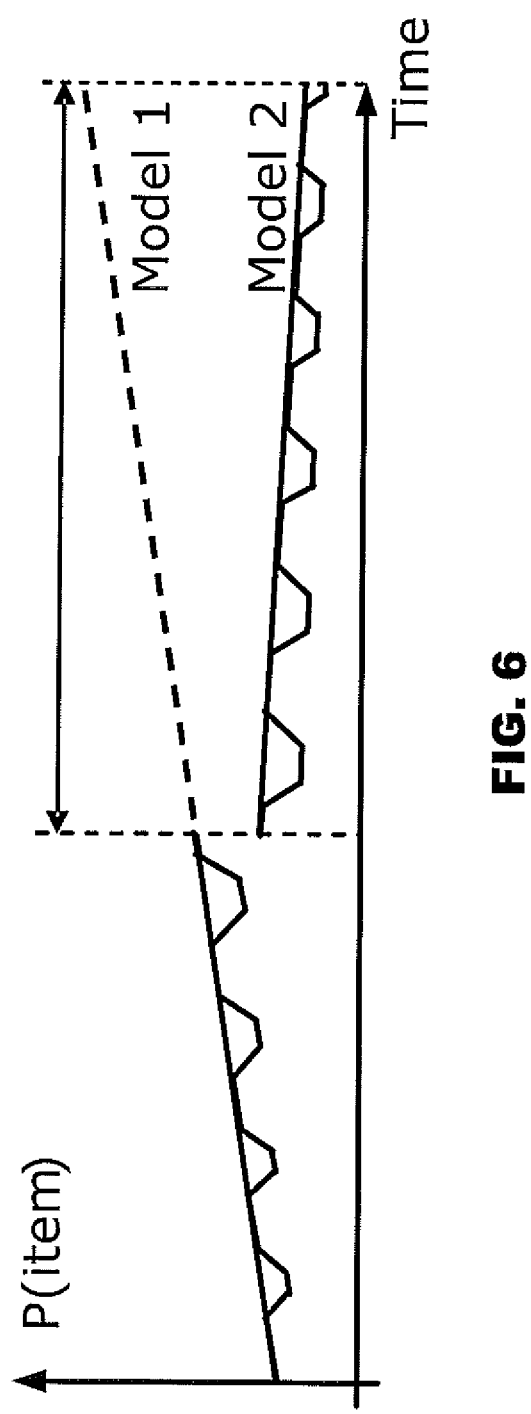
FIG. 6 is an exemplary graph of a two-segment lexical occurrence model with periodic modulation, according to the present disclosure.

At block 506, an optional cyclic component of the lexical occurrence model can be defined such that a multi-phase periodic modulation can be superimposed on the intensity function. The cyclic component can be used to model regular cyclic changes in rate and can have multiple periods and phases. FIG. 6 illustrates a two-segment model with periodic modulation that is modeled after a cyclic component of an exemplary lexical occurrence model.

At block 508, the acyclic and cyclic model components are optimized using a dynamic programming algorithm. The optimization results in a likelihood of the data to maximize. The likelihood can be computed as the product of the probability of the actual data values.

Figure 7:
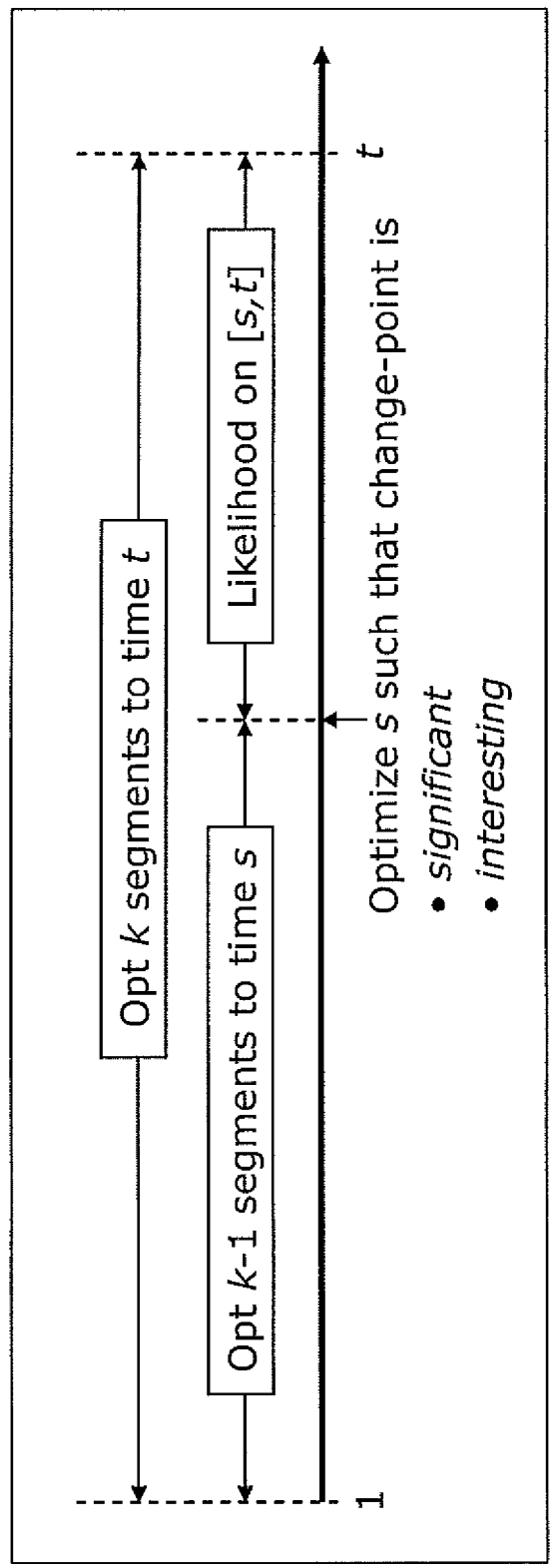
FIG. 7 illustrates an exemplary optimization of lexical occurrence model components, according to the present disclosure.

Referring briefly to FIG. 7, an exemplary optimization of the lexical model components using a dynamic programming algorithm is illustrated. The dynamic programming algorithm can optimize likelihood for the piecewise-linear component given the most recent data. There is no prescribed limit to the number of model segments in the optimization. An overall quadratic-time implementation is contemplated. Measures of significance and interest at change-points are used in the optimization. The dynamic programming algorithm can use a maximum-likelihood procedure, such as the exemplary procedure described herein below, to optimize the periodic component.

Figure 8:
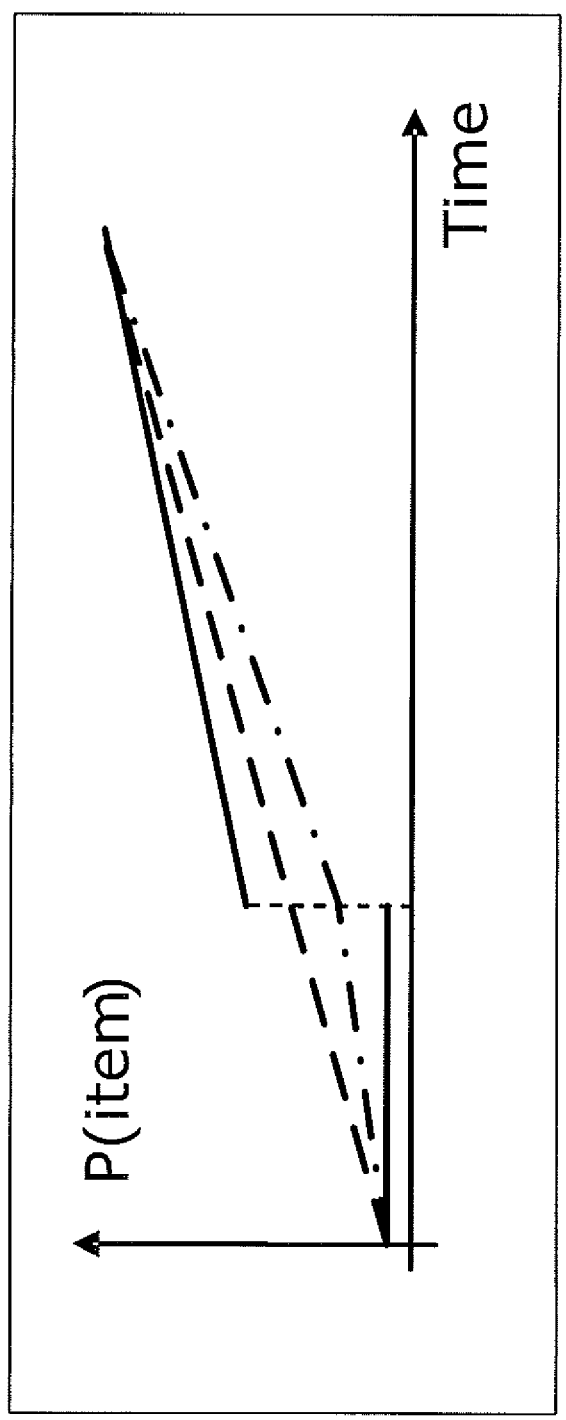
FIG. 8 is an exemplary graph of a significance test for change-points, according to the present disclosure.

At block 510, a significance test for change-points is applied. Various exemplary significance tests are described herein below for a piecewise-constant model and a piecewise-linear model. FIG. 8 is an exemplary graph of a significance test for change-points, according to the present disclosure. The difference in piecewise-linear segments is shown. If both piecewise-linear segments are constant, a 2×2 contingency table can be used. Otherwise, a standard F-test can be used to compare separate models (solid line) with a single model spanning both segments (dashed line). A continuity test can reveal if the slope changes but the intercept does not, then one less parameter is needed in the overall model. The F-test comparing separate models with a weighted two-phase regression model (green line).

At block 512, an interestingness test for change-points is applied. The most significant changes are often not the most interesting. When large amounts of data are received, a ranking based on significance can obscure interesting changes affecting rare events. Accordingly, a measure of interest or otherwise termed "interestingness" can be defined using conditional mutual information between lexical item (W) and model (M) given time (T):

$$I(W:M|T)=H(W|T)-H(W|M,T)$$

where H( ) is conditional entropy. The measure of interest measures the amount of information that can be learned from the change in the model, allowing for the fact that the models may each depend on time (a trend segment). The definition of the measure of interest is defined to cover all situations and can therefore be used to rank changes consistently. From an analyst's perspective, consistency of the interestingness measure is decisive.

At block 514, the change-points are coordinated. Typically, there is a lot of output from the change-detection procedure. An exemplary method for coordinating changes can identify change-events as graph nodes, create edges between nodes that share words and/or metavalues, run a clustering algorithm, and output a measure of interest ranked list of clusters.

In addition to the above, an optional bigram check can be implemented. Changes often occur for different words at the same time but for different reasons. Metadata do not always exist and may not be sufficient to separate node clusters. A bigram check can be used to only add edge connecting events with distinct words if bigram (document co-occurrence) frequency exceeds threshold. The bigram check is an effective filter against spurious combinations. The bigram check provides an unbiased estimate of true frequency of arbitrary bigram from merged priority-weighted samples of consolidated documents. The bigram check is efficient and reliable and yields no false positives. Most false zeroes have true frequencies are below threshold values.

At block 516, the results are output for visualization. Visualization can be in the form of a graph, plot, table, or other visualization output put on one or more output devices 116. The method 500 can end.

Provided below are two exemplary models, a piecewise-constant lexical occurrence model and a piecewise-linear lexical occurrence model. These models are provided for further explanation of the aforementioned systems and methods and are not intended to limit the scope of the appended claims.

Exemplary Piecewise-Constant Lexical Occurrence Model

A. Text Data Stream

In one embodiment of the present disclosure, a piecewise-constant model is used to detect and coordinate changes in lexical items. In this embodiment, a typical source of lexical items, structured into documents, each labeled with a time stamp and optionally with metadata is considered. An assumption is that each document contains a set of lexical items that are of interest. In some embodiments, a prescribed vocabulary is used. In other embodiments, an open-ended vocabulary is used. An open-ended vocabulary can be acquired, for example, as part of the analysis. In still other embodiments, a vocabulary can be seeded with lexical items. The internal structure of each document can be ignored, thereby treating each document or the collective whole of documents as a set of words. Exceptions can include lexical items of interest that are either n-grams or non-local conjunctions of words, in which case the vocabulary of these can be prescribed in advance.

A system of the present disclosure can be used in either a retrospective mode or a streaming mode. In retrospective mode, a corpus of text files is presented for end-to-end processing. In streaming mode, a summary file (previously generated by the system) is presented together with the most recent data. A new or updated summary file can be generated together with the output of the change-detection algorithms. The summary file can contain enough information about the history for the system to be able to reproduce the results as though it were done retrospectively, but in far less time. Data can be carried forward from summary file to summary file until a time horizon is reached which can depend on recent change-points, so the summary file does not grow without bound.

In either mode, the system creates regular bins of data, for example, daily, weekly, monthly, yearly, etc. The system can ignore the arrival time of each document within each bin. For each bin, the system can obtain frequency data: numbers of documents labeled with particular metavalues, and numbers of documents labeled with particular metavalues and containing particular words. The system can ignore multiple occurrences of words within documents. In many instances, the presence of a word in a document is more important than repetitions thereof because repetitions often add little further information.

Text streams always suffer from missing data. For this reason, the system does not make any assumption that successive bins correspond to regular time increments. If successive bins do correspond to regular time increments, the system can be tolerant of bins that are empty or that contain no data for particular metavalues.

The system analyzes frequencies of lexical items relative to documents. If the number of documents in each bin varies substantially then this can be separately tracked, but of greater interest here is the content of these documents. This makes the analysis more robust to missing data.

B. Poisson Likelihood

By way of example, consider a stream of bins of documents, containing $n_{mt}$ documents labeled with metavalue m in the bin at t, where $1 \leq m \leq M$ and t is discrete: $t=1, \ldots, T$. Let the (unknown) probability that a document labeled with metavalue m in the bin at t contains word (or lexical item) w be $p_{wmt}$, and the measured number of documents labeled with metavalue m in the bin at t that contain word w be $f_{wmt}$. Assume a Poisson model for this quantity, i.e.

$$f_{wmt} \sim \text{Poi}(n_{mt} p_{wmt})$$

where the present disclosure temporarily conflates the random variable with the measured value.

In one embodiment, the Poisson parameter $p_{wmt}$ is piecewise-constant in time. Let there be I time segments where the ith segment starts at $s_i$ and ends at $e_i = s_{i+1} - 1$, with $s_1 = 1$ and $e_I = T$. Assume for now that this time-segmentation is known. We also define $e_0 = 0$ and $s_{I+1} = T+1$ for convenience, and $s_i$, $i = 2, \ldots, I$ are referred to below as change-points. Let $T_i$ denote the time range $[s_i, e_i]$, and define $$N_{mi} = \sum_{t=s_i}^{e_i} n_{mt}, \quad F_{wmi} = \sum_{t=s_i}^{e_i} f_{wmt}$$

For word w and metavalue m in the overall log-likelihood is provided by equation (1), below.

$$\ln L_{wm} = \sum_{t=1}^{T} \{f_{wmt} \ln(n_{mt} p_{wmt}) - n_{mt} p_{wmt} - \ln(f_{wmt}!)\} \tag{1}$$

For the ith segment, let $p_{wmt}$ be equal to the constant rate $r_{wmi}$ for all $l \in T_i$; then the maximum-likelihood estimate of $r_{wmi}$ is $$\hat{r}_{wmi} = \frac{F_{wmi}}{N_{mi}}$$

and using this estimate for each i the log-likelihood becomes equation (2), below.

$$\ln L_{wm} = \sum_{i=1}^{I} \sum_{t=s_i}^{e_i} [f_{wmt} \ln(n_{mt} \hat{r}_{wmi}) - n_{mt} \hat{r}_{wmi} - \ln(f_{wmt}!)] \tag{2}$$

$$= \sum_{i=1}^{I} F_{wmi} \left( \ln\left(\frac{F_{wmi}}{N_{mi}}\right) - 1 \right) + \sum_{t=1}^{T} [f_{wmt} \ln n_{mt} - \ln(f_{wmt}!)]$$

The second term in equation (2) does not depend on the model or segmentation and can be treated as constant during the optimization.

C. Multi-Phase Periodic Modulation

The subscripts w and m are dropped hereinafter for brevity. Suppose that for a word w, and a metavalue m, there is a periodic modulation where each bin t is labeled with a phase p from some set P. For example for daily binning P=(Monday, ..., Sunday), or for hourly binning P={0, ..., 23}. More complex forms of cyclic behavior can also be accommodated. There is no requirement for a fixed period on t because of the possibility of missing data or, for example, to accommodate for a monthly variation and the fact that the months have unequal length. In this embodiment, the present disclosure assumes that the time-segmentation is known. Let $T_p$ denote the subset of T with phase p, and $T_{ip}$ denote the subset of $T_i$ with phase p. Also let $$N_p = \sum_{t \in T_p} n_t, \quad N_{ip}^{(k)} = \sum_{t \in T_{ip}} t^k n_t, \text{ for } k = 0, 1$$

$$F_p = \sum_{t \in T_p} f_t, \quad F_{ip} = \sum_{t \in T_{ip}} f_t$$

In this embodiment, the periodic effect can be represented as $$p_t = q_p r_i \text{ for } t \in T_{ip}$$

where $q_p \geq 0$ is common for all segments. Because only $|P|-1$ of these values are independent the present disclosure sets the largest equal to one, and if all the remaining $q_p$ also equal one then there is no periodic effect. The present disclosure can also map the phases to a smaller set where the values of $q_p$ are similar. For daily binning, for example, it has been found that different behavior is seen at weekends compared with weekdays, but the weekend-days are similar to each other, as are the weekdays. P is then binary. This mapping can be discovered automatically using a dynamic programming algorithm that optimizes both the final number of phases and the mapping.

Now the log-likelihood equation (1) becomes (ignoring the constant term) equation (3), below.

$$\ln L = \sum_{i=1}^{I} \sum_{p \in P} \sum_{t \in T_{ip}} [f_t \ln(q_p r_i) - n_t q_p r_i] \tag{3}$$

$$= \sum_{i=1}^{I} \sum_{p \in P} [F_{ip} \ln(q_p r_i) - N_{ip}^{(0)} q_p r_i]$$

To optimize the model we maximize with respect to $r_i$ and $q_p$:

$$\frac{\partial \ln L}{\partial r_i} = \sum_{p \in P} \left[ \frac{F_{ip}}{r_i} - N_{ip}^{(0)} q_p \right]$$

which is zero when $r_i$ is represented as shown below in equation (4).

$$r_i = \frac{F_i}{\sum_{p \in P} N_{ip}^{(0)} q_p}, \, i = 1, \ldots, I \tag{4}$$

Also $\frac{\partial \ln L}{\partial q_p} = \sum_{i=1}^{I} \left[ \frac{F_{ip}}{q_p} - N_{ip}^{(0)} r_i \right]$ which is zero when $$\frac{F_p}{q_p}$$

is represented as shown below in equation (5).

$$\frac{F_p}{q_p} = \sum_{i=1}^{I} N_{ip}^{(0)} r_i = \sum_{i=1}^{I} \frac{N_{ip}^{(0)} F_i}{\sum_{m \in P} N_{im}^{(0)} q_m}, \, p \in P \tag{5}$$

These may be solved for the $|P|-1$ independent values of $q_p$, and hence the present disclosure obtains $\{r_i\}_{i=1, \ldots, I}$ using equation (4). For a two-phase periodic modulation, equation (5) transforms into a polynomial equation of degree I for the unknown $q_p$, which can be solved exactly for $I \leq 4$ or numerically for any I.

D. Dynamic Programming Optimization

In this embodiment, the present disclosure assumes that the time segmentation (equivalently the set of change-points $s_i$, i=2, ..., I) is unknown, although this may not necessarily be the case. A dynamic programming algorithm can be used to efficiently find the optimum segmentation. The periodic modulation parameters $q_p$ are assumed known. The reason for this is that these are global parameters and to attempt to optimize these at the same time as the segmentation would violate the Bellman principle of optimality. If $\{q_p\}_{p \in P}$ are unknown then the method below can be iterated: initially the present disclosure assumes all $q_p=1$, finds the optimum segmentation, and then solves equation (5) for $q_p$. The method can repeat. This method generally converges after two or three iterations.

In one embodiment, the dynamic programming algorithm can be represented as follows. Let
- $A(J, \tau)$ be the total log-likelihood (excluding the constant term) for an optimal J-segment model on $1 \leq t \leq \tau$,
- $B(J, \tau)$ be the location of the most recent change-point (start of segment J) for this model, and
- $L(s, \tau)$ be the contribution to the log-likelihood for the data from s to $\tau$ inclusive, assuming a constant Poisson intensity optimized on that interval, and ignoring the constant term.

Then from equation (3), the present disclosure derives equation (6), below.

$$L(s, \tau) = \sum_{p \in P} \sum_{\substack{t=s \\ t \in T_p}}^{\tau} [f_t \ln(q_p \hat{r}_J) - n_t q_p \hat{r}_J] \quad (6)$$

And, from equation (4), the present disclosure derives equation (7), below.

$$\hat{r}_J = \frac{\sum_{t=s}^{\tau} f_t}{\sum_{p \in P} q_p \sum_{\substack{t=s \\ t \in T_p}}^{\tau} n_t} \quad (7)$$

An exemplary method the exemplary dynamic programming algorithm is illustrated below.

1) Initialization $I \leftarrow 1$

2) Recursion

For each $\tau = 1, \ldots, T$ a) $A(1, \tau) \leftarrow L(1, \tau); B(1, \tau) \leftarrow 1$ b) For each $J = 2, \ldots, I+1$ $$A(J, \tau) \leftarrow \max_{\substack{2 \leq s \leq \tau \\ B(J-1, s-1) > 0 \\ sig(s)}} \{A(J-1, s-1) + L(s, \tau)\}$$

$B(J, \tau) \leftarrow$ corresponding argmax s, 0 if none c) If $B(I+1, \tau) > 0$ then $I \leftarrow I+1$ 3) Optimum segmentation For each $i = I, \ldots, 2, s_i \leftarrow B(i, s_{i+1}-1)$ In step 2(b), if a J−1-segment model exists on [1, s−1](for some s>1) then the latest segment on [s,$\tau$] can potentially be appended to it giving a J-segment model on [1,$\tau$]. The restriction sig(s) denotes that the potential change-point at s satisfies both the criterion of significance and that of interestingness. It is these criteria that limit the number of segments I discovered: it is not uncommon for no significant changes to be discovered, in which case the procedure terminates with I=1.

This procedure is optimal: recursively, the optimal segmentation into I segments on [1,T] must be given by the maximum over s of the optimal segmentation into I−1 segments on [1,s−1] combined with a single segment on [s,T]. And, no segmentation into less than I segments is expected to give a higher likelihood than the optimum for I.

Various additional quantities are also stored during step 2(b) for recovery during the back-trace for the optimum segmentation, including the model parameters for the Jth segment [s, $\tau$](which for the piecewise-linear model will be $\hat{a}_J$, $\hat{b}_J$, and the measures of significance and interestingness for the change-point at s. These quantities are then available for output at the end of the procedure.

E. Significance Test for Change-Points

In an exemplary test for significance of a potential change-point at s, let $s_{J-1}=B(J-1,s-1)$ be the start of the previous segment J−1, and $e_{J-1}=s-1$ be segment end. In one embodiment, the estimated rate $\hat{r}_J$ equation (7) can be significantly different from that for the previous segment, which can be given by equation (8), below.

$$\hat{r}_{J-1} = \frac{\sum_{t=s_{J-1}}^{e_{J-1}} f_t}{\sum_{p \in P} q_p \sum_{\substack{t=s_{J-1} \\ t \in T_p}}^{e_{J-1}} n_t} \quad (8)$$

These two proportions can be compared using standard methods, for example, a 2×2 contingency table using Fisher's method for small frequencies and the chi-square test for large frequencies. If some $q_p \neq 1$ then the denominators can take non-integer values, but the nearest integer can be used.

F. Measure of Interest for Change-Points

The most significant changes are often not the most interesting ones. If a word (or more generally a lexical item) is relatively frequent then changes affecting it are likely to be significant. However, changes affecting less frequent items may be of greater interest to an analyst of the data, in which case it is inappropriate to rank the items by significance level. For this reason, the present disclosure can use a separate criterion of interestingness, in addition to significance, both as a test for acceptance of a potential change-point and as a ranking criterion. A measure of interestingness provided herein is based upon information theory.

The null hypothesis is that there is no change in rate at s, that is, $r_J = r_{J-1}$. The present disclosure can test this hypothesis to measure both significance and interestingness using the estimated values from equation (7) and equation (8). The principal difference between these two measures can be summarized as follows: if the null hypothesis is false, then as the amount of data increases, the significance test statistic increases in magnitude without bound, and the measure of interest converges to a finite value depending only on $r_{J-1}$ and $r_J$.

The degree of interest of a change in rate (from $r_{J-1}$ to $r_J$) can be measured by the amount of information conveyed by this change. To evaluate this, the present disclosure can compare two possible models on the latest segment $[s,\tau]$: the model derived for that segment ($r_J$) and the model extrapolated from the previous segment ($r_{J-1}$). The present disclosure can define the following three variables:

W: Bernoulli random variable for presence of word w within a document,

M: Bernoulli random variable for selecting between the two models: 0 for $r_{J-1}$, 1 for $r_J$, T: Discrete uniform random variable taking a value from s to $\tau$.

The conditional mutual information between W and M given T can be defined as shown below in equation (9)

$$I(W;M|T)=H(W|T)-H(W|M,T) \qquad (9)$$

where $H(\bullet|\bullet)$ is conditional entropy:

$$H(Y|X)=-\Sigma_x\Sigma_y P(x,y)\log_2 P(y|x)$$

I(W;M|T) measures the amount of information regarding W brought by knowledge of M that is not already contained in T. A reason for adopting this definition conditional on T is that this definition also covers the case where the segments are not constant but involve trends. For the piecewise-constant model, T conveys no information about W. Let $P(M=1)=\theta$, and $L_J=\tau-s+1$ be the length of the Jth segment. If the variables W, M, T are independent the joint distribution can be given by $$P(W=w, M=m, T=t) = \begin{cases} \dfrac{(1-r_{J-1})(1-\theta)}{L_J} & \text{if } W=0, M=0 \\ \dfrac{r_{J-1}(1-\theta)}{L_J} & \text{if } W=1, M=0 \\ \dfrac{(1-r_J)\theta}{L_J} & \text{if } W=0, M=1 \\ \dfrac{r_J\theta}{L_J} & \text{if } W=1, M=1 \end{cases}$$

From the joint distribution, the conditional entropies can be derived and substituted in equation (9) as shown below:

$$H(W|T)=H(\theta r_J+(1-\theta)r_{J-1})$$

$$H(W|M,T)=\theta H(r_J)+(1-\theta)H(r_{J-1})$$

where $H(\bullet)$ is the entropy function:

$$H(p)=-p\log_2 p-(1-p)\log_2(1-p)$$

Mutual information can be normalized. An exemplary measure of interest can be defined as provided in equation (10), below.

$$I_{r_{J-1}:r_J} = \frac{(1+w)I(W;M|T)}{H(W|T)+w} \qquad (10)$$

Equation (10) can be evaluated using the estimated values $\hat{r}_J, \hat{r}_{J-1}$ from equations (7) and (8) with $\theta=\frac{1}{2}$. It can be appreciated that $I_{r_{J-1}:r_J}\geq 0$, with $I_{r_{J-1}:r_J}=0 \Leftrightarrow r_J=r_{J-1}$. Also, $I_{r_{J-1}:r_J}\leq 1$, with $I_{r_{J-1}:r_J}=1 \Leftrightarrow r_{J-1}=0, r_J=1$ or vice versa. The parameter w can control the sensitivity of the measure for infrequent events; for example, as the value decreases, the sensitivity of the measure increases. A value w=0.1 is a good compromise in practice. A desirable feature of the interestingness measure is that it gives greater weight to a small increment from close to zero than it does to the same increment from higher up that has less novelty value, as illustrated in the following table:

| $r_{J-1}$ | $r_J$ | $1000 \times I_{r_{J-1}:r_J}$ |
|---|---|---|
| 0.0 | 0.001 | 5.181 |
| 0.1 | 0.101 | 0.004 |

A candidate change-point at s is accepted (sig(s) in equation (8)) if the significance measure and this measure each reach required thresholds.

G. Time and Space Requirements

If we initially create the following as linear-time arrays for $1\leq\tau\leq T$ and $p\in P$, as shown below in equations (11) and (12)

$$F_\tau = \sum_{t=1}^\tau f_t, \quad F_{\tau p} = \sum_{\substack{t=1 \\ t\in T_p}}^\tau f_t \qquad (11)$$

$$N_{\tau p}^{(k)} = \sum_{\substack{t=1 \\ t\in T_p}}^\tau t^k n_t, \text{ for } k=0,1 \qquad (12)$$

and define all equations (11) and (12) as zero for $\tau=0$, then equations (6) and (7) become equation (13) and equation (14) as shown below.

$$L(s,\tau) = \sum_{p\in P}[\ln(q_p\hat{r}_J)(F_{\tau p}-F_{s-1,p})-q_p\hat{r}_J(N_{\tau p}^{(0)}-N_{s-1,p}^{(0)})] \qquad (13)$$

$$\hat{r}_J = \frac{F_\tau - F_{s-1}}{\sum_{p\in P} q_p(N_{\tau p}^{(0)}-N_{s-1,p}^{(0)})} \qquad (14)$$

With this formulation, the recursion step is $\sim O(T^2)$ in time. The space requirements are quite modest: in addition to the above linear arrays, $A(\bullet,\bullet)$ and $B(\bullet,\bullet)$ are each $\sim O(I_{max}T)$, where $I_{max}$ is the maximum number of segments permitted.

Piecewise-Linear Lexical Occurrence Model

A. Poisson Likelihood

If the Poisson probability with which a lexical item occurs in a document ($p_{wmt}$) trends gradually up or down over time, the piecewise-constant model can represent this as a flight of steps, which is suboptimal. Trends can be accommodated by assuming more generally that $p_{wmt}$ is piecewise-linear. As above, it is initially assumed that the segmentation is known. Again, the subscripts w and m are dropped for brevity, and allow for a periodic modulation.

For the ith segment, let $$p_i = q_p r_i \text{ for } t\in T_p$$

where $r_i = a_i + b_i(t-e_{i-1})$, with $e_{i-1}=s_i-1$ being the end of the previous segment. For a constant segment the coefficient $b_i$ is zero. The log-likelihood equation (1) becomes equation (15), below.

$$\ln L = \qquad (15)$$

$$\sum_{i=1}^I \sum_{p\in P} \sum_{t\in T_{ip}} \{f_t\ln[q_p(a_i+b_i(t-e_{i-1}))] - n_t q_p(a_i+b_i(t-e_{i-1}))\} +$$

$$\sum_{t=1}^{T} [f_t \ln n_t - \ln(f_t!)]$$

Again the final term does not depend on the model or segmentation, and is the same constant term as before. Taking the partial derivative with respect to $q_p$, equation (15) becomes equation (16), below.

$$\frac{\partial \ln L}{\partial q_p} = \sum_{i=1}^{I} \sum_{t \in T_{ip}} \left[ \frac{f_t}{q_p} - n_t(a_i + b_i(t - e_{i-1})) \right] = \quad (16)$$

$$\frac{F_p}{q_p} - \sum_{i=1}^{I} [(a_i - b_i e_{i-1})N_{ip}^{(0)} + b_i N_{ip}^{(1)}]$$

Given a segmentation and a model in the form $\{a_i, b_i\}_{i=1, \ldots, I}$, the present disclosure can obtain $q_p$ by setting equation (16) to zero. However, maximizing equation (15) directly with respect to $\{a_i, b_i\}_{i=1, \ldots, I}$ is not as simple because the algorithm would involve additional iteration loops and would be too slow.

B. Trend Segment Parameter Estimation

1) Weighted Linear Regression:

Because the log-likelihood is hard to maximize for $a_i$, $b_i$ the present disclosure can use weighted linear regression instead. Consider the regression model $$a_i + b_i(t - e_{i-1}) = y_t = \frac{f_t}{h_t n_t}$$

where $h_t = q_p$ for $t \in T_p$

Setting the derivatives with respect to $a_i$ and $b_i$ of the total weighted squared error, as shown below in equation (17), $$Q = \sum_{t \in T_i} v_i [a_i + b_i(t - e_{i-1}) - y_t]^2 \quad (17)$$

to zero and solving yields equation (18) and equation (19), below, $$\hat{a}_i = \frac{\left(\sum v_i(t - e_{i-1})^2\right)\left(\sum v_i y_i\right) - \left(\sum v_i(t - e_{i-1})\right)\left(\sum v_i(t - e_{i-1})y_i\right)}{D} \quad (18)$$

$$\hat{b}_i = \frac{\left(\sum v_i\right)\left(\sum v_i(t - e_{i-1})y_i\right) - \left(\sum v_i(t - e_{i-1})\right)\left(\sum v_i y_i\right)}{D} \quad (19)$$

where, $$D = (\Sigma v_t)(\Sigma v_t(t - e_{i-1})^2) - (\Sigma v_t(t - e_{i-1}))^2$$

and all summations are over $t \in T_i$.

From the exemplary Poisson model, $f_t \sim P(n_t p_t)$ so $\text{Var}(f_t) \approx n_t p_t$, hence $$\text{Var}(y_t) \approx \frac{n_t p_t}{(h_t n_t)^2} = \frac{p_t}{h_t^2 n_t}$$

Setting $v_t \propto n_t$ therefore approximately equalizes the variance as well as giving greater weight to bins containing more data. In fact we use $$v_t = \frac{n_t}{\frac{1}{T}\sum_{\tau=1}^{T} n_\tau}$$

so that if all $n_t$ are equal then all $v_t = 1$.

Notation: Let $$T_i^{(k)} = \sum_{t \in T_i} v_t t^k \text{ for } k = 0, 1, 2 \quad (20)$$

$$D = T_i^{(0)} T_i^{(2)} - (T_i^{(1)})^2 \quad (21)$$

$$R_{ip}^{(k)} = \sum_{t \in T_{ip}} \frac{v_t t^k f_t}{n_t} \text{ for } k = 0, 1, \; S_{ip} = \sum_{t \in T_{ip}} \frac{v_t f_t^2}{n_t^2} \quad (22)$$

$$U_{ip} = \frac{(T_i^{(2)} - e_{i-1} T_i^{(1)}) R_{ip}^{(0)} - (T_i^{(1)} - e_{i-1} T_i^{(0)}) R_{ip}^{(1)}}{D} \quad (23)$$

$$V_{ip} = \frac{T_i^{(0)} R_{ip}^{(1)} - T_i^{(1)} R_{ip}^{(0)}}{D} \quad (24)$$

Then the regression parameters equations (18) and (19) can be shown to be $$\hat{a}_i = \sum_{p \in P} \frac{U_{ip}}{q_p}, \; \hat{b}_i = \sum_{p \in P} \frac{V_{ip}}{q_p} \quad (25)$$

Also, substituting the regression parameters into equation (17), expanding and using the same definitions leads to the following expression for evaluating the residual sum of squares:

$$RSS = (\hat{a}_i - e_{i-1}\hat{b}_i)^2 T_i^{(0)} + 2(\hat{a}_i - e_{i-1}\hat{b}_i)\hat{b}_i T_i^{(1)} + \quad (26)$$

$$\hat{b}_i^2 T_i^{(2)} + \sum_{p \in P} \frac{1}{q_p} \left\{ \frac{S_{ip}}{q_p} - 2\hat{b}_i R_{ip}^{(1)} - 2(\hat{a}_i - e_{i-1}\hat{b}_i) R_{ip}^{(0)} \right\}$$

Setting equation (16) to zero and substituting for the weighted-least-squares estimates $\hat{a}_i$, $\hat{b}_i$ also enables us to re-estimate the periodic modulation parameters $q_p$ from these quantities to derive equation (27), below:

$$\sum_{m \in P} \left\{ \sum_{i=1}^{I} [(U_{im} - e_{i-1} V_{im}) N_{ip}^{(0)} + V_{im} N_{ip}^{(1)}] - F_p \delta_{pm} \right\} \frac{1}{q_m} = 0 \quad (27)$$

for all $p \in P$, where $\delta_{pm} = 1$ if $p = m$, otherwise zero. The nullspace of this matrix (found using a singular value decomposition) is spanned by the vector of reciprocals of the nonzero periodic parameters and, once found, the nonzero periodic parameters can be scaled so that the largest is equal to one.

2) Likelihood Adjustment:

If we assume $a_i=\hat{a}_i+\epsilon$, $b_i=\hat{b}_i+\delta$ substitute into the contribution to the log-likelihood equation (15) from the ith segment, set the derivatives with respect to $\epsilon$ and $\delta$ to zero, and expand to first-order in $\epsilon$ and $\delta$, then we get the following pair of equations that are linear in these increments:

$$\sum_{i \in T_i} \left[ \frac{f_t}{\hat{a}_i + \hat{b}_i(t-e_{i-1})} \left( 1 - \frac{\epsilon + \delta(t-e_{i-1})}{\hat{a}_i + \hat{b}_i(t-e_{i-1})} \right) \right] = \sum_{p \in P} q_p N_{ip}^{(0)}$$

$$\sum_{i \in T_i} \left[ \frac{f_t(t-e_{i-1})}{\hat{a}_i + \hat{b}_i(t-e_{i-1})} \left( 1 - \frac{\epsilon + \delta(t-e_{i-1})}{\hat{a}_i + \hat{b}_i(t-e_{i-1})} \right) \right] = \sum_{p \in P} q_p (N_{ip}^{(1)} - e_{i-1} N_{ip}^{(0)})$$

The equations immediately above can be solved for $\epsilon$ and $\delta$ giving improved estimates of the parameters, and the process can be iterated. Generally, this process converges after one or two iterations. The present embodiment now has estimates of $a_i$ and $b_i$ that maximize the likelihood; however, the likelihood is maximized at the expense of additional summations over the data. Fortunately, the weighted-least-squares estimates are usually very close to the maximum likelihood estimates, so this step can be omitted if computational efficiency is a priority.

3) Segment Constant Vs. Trend:

The decision as to whether to treat the latest segment spanning [s,τ] as constant or trend can be based on any combination of the following exemplary criteria:

Absolute value of slope parameter $\hat{b}_i$
Change in $r_t$ over the length of the segment
Significance of regression slope
Likelihood using trend model compared to that for constant model.

In practice, each of the aforementioned criteria has been found to be useful. In general, each constant segment introduces one less parameter into the overall model, resulting in a simpler description of the data.

C. Dynamic-Programming Optimization of PLM

The present embodiment can assume that the segmentation is not known, although this is not necessarily the case. The optimization proceeds similarly to that described above for the piecewise-constant model. If the periodic modulation parameters $q_p$ are not known, as is usually the case, then the procedure is to initially assume all $q_p=1$, find the optimum segmentation and model, re-estimate $q_p$ using equation (27), and repeat. Two or three iterations of this process are generally sufficient.

The likelihood contribution L(s,τ) for the Jth segment [s,τ] is obtained using equation (13) for a constant segment. For a trend segment, equation (28) as shown below is used.

$$L(s, \tau) = \quad (28)$$
$$\sum_{p \in P} \sum_{\substack{i=s \\ i \in T_p}}^{\tau} \{ f_i \ln[q_p(\hat{a}_J + \hat{b}_J(t-s+1))] - n_i q_p(\hat{a}_J + \hat{b}_J(t-s+1)) \}$$

The present embodiment defers consideration of how to express this in terms of differences in cumulative values at segment endpoints. The regression parameters and the residual sum of squares can all be evaluated using linear-time arrays for the quantities defined in equations (20) and (22), namely equation (29), $$T_\tau^{(k)} = \sum_{i=1}^{\tau} v_t t^k, \quad R_{tp}^{(k)} = \sum_{\substack{i=1 \\ i \in T_p}}^{\tau} \frac{v_t t^k f_i}{n_i}, \quad S_{tp} = \sum_{\substack{i=1 \\ i \in T_p}}^{\tau} \frac{v_t f_i^2}{n_i^2} \quad (29)$$

for $1 \le \tau \le T$, with all of these zero for $\tau=0$. Since the Jth segment extends from s to τ inclusive, equation (29) becomes, for example, $$T_J^{(k)} = T_\tau^{(k)} - T_{s-1}^{(k)}, R_{J_p}^{(k)} = R_{\tau p}^{(k)} - R_{s-1,p}^{(k)}$$

and so forth. All the quantities in equation (20) through equation (24) can be obtained in this way, and also the regression parameters $\hat{a}_J$, $\hat{b}_J$ from equation (25), the RSS from equation (26), and the periodic modulation parameters from equation (27).

With the segment model and likelihood available for [s,τ], the optimization can proceed once the restriction sig(s) is defined for segments that may involve trends.

D. Significance Tests for PLM Change-Points

1) Difference Between Regression Lines:

Let $s_J=s$, $e_J=\tau$ be the start and end of the Jth segment, $s_{J-1}=B(J-1,s-1)$, $e_{J-1}=s-1$ be the start and end of the previous segment. Also define $e_{J-2}=s_{J-1}-1$. There are two tests can be used for each candidate change-point. A first test can be used to decide whether a significant change exists. A second test can be used to decide what form the significant change takes.

The first test may be used when at least one of the two segments is a trend. The null hypothesis ($H_0$) is that there is no change. That is, the Jth segment is a linear extrapolation of the J−1st. A single regression line can be first fit through both segments as described above and obtain the residual sum of squares $RSS_0$ using equation (26). The alternative hypothesis ($H_1$) is that there is a change-point at s, and $RSS_1$ can be obtained as the sum of the residual sums of squares over the two segments, fitted separately. Then, the F-statistic, below, $$F = \frac{(RSS_0 - RSS_1)/2}{RSS_1 / (e_J - s_{J-1} - 3)} \sim F_{2, e_J - s_{J-1} - 3} \text{ under } H_0$$

defines the critical region. The number of degrees of freedom in the denominator is n−m where $n=e_J-s_{J-1}+1$ is the total number of data points in the two segments, and m=4 is the total number of estimated parameters in the separate models. Although this test and a similar one in the next section assume normal residuals, the tests have been found to nevertheless work well in this application.

2) Difference Between Regression Slopes:

If a change-point involving a trend is significant then the next question that needs to be addressed is whether the change involves a discontinuity (as for the piecewise-constant model) or merely a corner, in which case the slope changes but the intercept does not. A corner introduces one less parameter into the overall model, resulting in a simpler description of the data. To test whether a change involves a discontinuity, a modified two-phase linear regression can be used. The modified two-phase linear regression can incorporate the weights $v_t$. The null hypothesis $H_0$ is that the regression lines for segments J−1 and J coincide at $e_{J-1}$.

$$a_{J-1} + b_{J-1}(e_{J-1} - e_{J-2}) = a_J$$

The above constraint can be incorporated into the weighted squared error criterion using a Lagrange multiplier:

$$Q = \sum_{j=J}^{J} \sum_{i=s_j}^{e_j} v_t [a_j + b_j(t - e_{j-1}) - y_t]^2 + 2\lambda [a_J - a_{J-1} - b_{J-1}(e_{J-1} - e_{J-2})]$$

Setting the derivatives with respect to the four parameters and $\lambda$ to zero leads to the following system of equations for the optimum solution:

$$\hat{b}_{J-1} = (c_{22}c_{13} - c_{12}c_{23})/(c_{11}c_{22} - c_{12}^2)$$

$$\hat{a}_{J-1} = \overline{Y}_{J-1} - \hat{b}_{J-1}\overline{T}_{J-1} + \frac{\lambda}{T_{J-1}^{(0)}}$$

$$\hat{b}_J = (c_{11}c_{23} - c_{12}c_{13})/(c_{11}c_{22} - c_{12}^2)$$

$$\hat{a}_J = \overline{Y}_J - \hat{b}_J \overline{T}_J - \frac{\lambda}{T_J^{(0)}}$$

where $$w = \frac{T_{J-1}^{(0)} T_J^{(0)}}{T_{J-1}^{(0)} + T_J^{(0)}}, \overline{T}_{J-1} = \frac{T_{J-1}^{(1)}}{T_{J-1}^{(0)}}, \overline{T}_J = \frac{T_J^{(1)}}{T_J^{(0)}}$$

$$\overline{Y}_{J-1} = \frac{\sum_{p \in P} \frac{1}{q_p} R_{J-1,p}^{(0)}}{T_{J-1}^{(0)}}, \overline{Y}_J = \frac{\sum_{p \in P} \frac{1}{q_p} R_{J_p}^{(0)}}{T_J^{(0)}}$$

$$d_1 = \overline{T}_{J-1} - e_{J-1}, d_2 = \overline{T}_J - e_{J-1}, d_3 = \overline{Y}_J - \overline{Y}_{J-1}$$

$$c_{11} = T_{J-1}^{(2)} - T_{J-1}^{(1)} \overline{T}_{J-1} + w d_1^2$$

$$c_{22} = T_J^{(2)} - T_J^{(1)} \overline{T}_J + w d_2^2, c_{12} = -w d_1 d_2$$

$$c_{13} = \sum_{p \in P} \frac{1}{q_p} (R_{J-1,p}^{(1)} - \overline{Y}_{J-1} R_{J-1,p}^{(0)}) - w d_3 d_1$$

$$c_{23} = \sum_{p \in P} \frac{1}{q_p} (R_{J_p}^{(1)} - \overline{Y}_J R_{J_p}^{(0)}) - w d_3 d_2$$

$$\lambda = w(d_3 + d_1 \hat{b}_{J-1} - d_2 \hat{b}_J)$$

All these quantities can be obtained from the arrays defined in equation (29). From this solution, equation (26) gives $RSS_0$ which is compared with $RSS_1$ using $$F = \frac{RSS_0 - RSS_1}{RSS_1/(e_J - s_{J-1} - 3)} \sim F_{1, e_J - s_{J-1} - 3} \text{ under } H_0$$

If a change-point is determined to be continuous with a corner then the two-phase regression model can be adopted, as determined above for both segments. However, if two consecutive change-points consist of such corners then the middle segment would inherit two distinct models from the separate two-phase regressions, and these would have to be reconciled. So, instead, the present embodiment makes an adjustment to the model for one segment only, depending on the type of the Jth segment, as shown below.

Trend: Set $\hat{a}_J' = \hat{a}_{J-1} + \hat{b}_{J-1}(e_{J-1} - e_{J-2})$

Constant: Set $\hat{b}_{J-1}' = (\hat{a}_J - \hat{a}_{J-1})/(e_{J-1} - e_{J-2})$ In the first case the intercept of the Jth segment is adjusted to match the end of the J−1st segment, whereas in the second the slope of the J−1st segment, which has to be a trend, is adjusted to match the intercept of the Jth segment. Although slightly suboptimal, this method can handle any number of consecutive connected segments. Within the dynamic programming method, if $\hat{b}_{J-1}'$ is set in this way then because this affects the previous (not the current) segment it can be recorded in the main loop as $$\hat{b}_{J-1}'(J, \tau) \leftarrow \begin{cases} \hat{b}_{J-}' & \text{if continuity adjustment made} \\ 0 & \text{otherwise} \end{cases}$$

During the back-trace, if this value is nonzero for the Jth segment then it overrides the usual value recorded for the J−1st.

E. Measure of Interest for PLM Change-Points

In addition to passing the significance test, a potential change-point can again satisfy the interestingness requirement based on conditional mutual information (equations (9) and (10)). The present embodiment now involves four model parameters as shown below in equation (30).

$$I_{a_{J-1}, b_{J-1}; a_J, b_J} = \frac{(1+w)I(W; M \mid T)}{H(W \mid T) + w} \quad (30)$$

The two models for the Jth segment $[s_J, e_J]$ are derived for that segment $(a_J, b_J)$ and extrapolated from the preceding segment $(a_{J-1}, b_{J-1})$. If the variables W, M, T are defined, as defined above, then the joint distribution is now given by:

$$P(W = w, M = m, T = t) = \begin{cases} \frac{(1 - a_{J-1} - b_{J-1}(t - e_{J-2}))(1 - \theta)}{L_J} & \text{if } W = 0, M = 0 \\ \frac{(a_{J-1} + b_{J-1}(t - e_{J-2}))(1 - \theta)}{L_J} & \text{if } W = 1, M = 0 \\ \frac{(1 - a_J - b_J(t - e_{J-1}))\theta}{L_J} & \text{if } W = 0, M = 1 \\ \frac{(a_J + b_J(t - e_{J-1}))\theta}{L_J} & \text{if } W = 1, M = 1 \end{cases}$$

for $t = s_J, \ldots, e_J$, where $L_J = e_J - s_J + 1$ is the length of this segment. The conditional entropies can then be obtained, as shown below.

$$H(W \mid T) = \frac{1}{L_J} \sum_{t=s_J}^{e_J} H[\theta(a_J + b_J(t - e_{J-1})) + (1-\theta)(a_{J-1} + b_{J-1}(t - e_{J-2}))]$$

$$H(W \mid M, T) =$$

$$\frac{1}{L_J} \sum_{t=s_J}^{e_J} [\theta H(a_J + b_J(t - e_{J-1})) + (1-\theta) H(a_{J-1} + b_{J-1}(t - e_{J-2}))]$$

Here, again, H(•) is the entropy function. The aforementioned equations are evaluated using the estimated values $\hat{a}_{J-1}, \hat{b}_{J-1}, \hat{a}_J, \hat{b}_J$, and with $\theta = \frac{1}{2}$. It should be noted that the evaluation involves six terms (two for each H(•)), all of which can have the following general form:

$$\sum_{t=s}^{e}(\alpha+\beta t)\log_2(\alpha+\beta t)$$

for various values of α and β. Because the sum over t could degrade the overall algorithm from quadratic time to cubic time the present embodiment can eliminate this possibility by applying the Euler-Maclaurin formula in the following form:

$$\int_{t=s}^{e} f(t)dt = \frac{1}{2}h(f_0 + 2f_1 + \ldots + 2f_{n-1} + f_n) -$$

$$\frac{1}{12}h^2(f_n^{(1)} - f_0^{(1)}) + \frac{1}{720}h^4(f_n^{(3)} - f_0^{(3)}) - \ldots$$

where $f_i = f(s+ih)$, $nh=e-s$, and $f_i^{(k)}$ is the kth derivative. Since in this case s and e are integers, h can be set to 1. The following indefinite integral (for β≠0) can also be used:

$$G_{\alpha,\beta}(t) \triangleq \int (\alpha+\beta t)\ln(\alpha+\beta t)dt = \left(\frac{\alpha^2}{2\beta} + \alpha t + \frac{\beta}{2}t^2\right)\ln(\alpha+\beta t) - \frac{\alpha}{2}t - \frac{\beta}{4}t^2$$

and hence obtain:

$$\sum_{t=s}^{e}(\alpha+\beta t)\ln(\alpha+\beta t) =$$

$$G_{\alpha,\beta}(e) - G_{\alpha,\beta}(s) + \frac{1}{2}((\alpha+\beta s)\ln(\alpha+\beta s) + (\alpha+\beta e)\ln(\alpha+\beta e)) +$$

$$\frac{1}{12}\beta\ln\left(\frac{\alpha+\beta e}{a+\beta s}\right) - \frac{1}{720}\beta^3\left(\frac{1}{(\alpha+\beta s)^2} - \frac{1}{(\alpha+\beta e)^2}\right) + \ldots$$

All the terms on the right-hand side are evaluated at the endpoints of the segment, and in practice the last term is usually negligible. All that remains is to divide the result by ln(2). This makes it possible to efficiently compute the conditional mutual information (equation (9)) and measure of interest (equation (30)).

Having the measure of interest consistently defined for both constant and trend segments brings two major advantages:

1) A single threshold value can be used for all change-points, whether the previous and latest segments are constant or trend.
2) The measure can be carried forward into the coordination phase for weighting events that may extend over several consecutive change-points of various types.

F. Quadratic-Time Implementation

Thus far, the following steps in the dynamic-programming optimization of the piecewise-linear model are based on linear arrays evaluated at segment ends:

3) setting the parameters, assuming the likelihood adjustment step is omitted,
4) both significance tests,
5) interestingness measure.

If the segment likelihood equation (28) can be similarly treated then the formulation becomes a complete linear-space, quadratic-time formulation. First recall the definitions in equations (11) and (12), and similarly define $$F_\tau^{(k)} = \sum_{t=1}^{\tau} t^k f_t$$

for k=0, . . . , 11, with all $F_\tau^{(k)}$=0 for τ=0. Also define $$G(s,\tau) = \sum_{t=s}^{\tau} f_t \ln(\hat{a}_J + \hat{b}_J(t-s+1)) \tag{31}$$

Then, equation (28) becomes $$L(s,\tau) =$$

$$G(s,\tau) - \sum_{p\in P}\{q_p(\hat{a}_J - \hat{b}_J(s-1))[N_{\tau p}^{(0)} - N_{s-1,p}^{(0)}] + q_p\hat{b}_J[N_{\tau p}^{(1)} - N_{s-1,p}^{(1)}] -$$

$$\ln q_p [F_{\tau p} - F_{s-1,p}]\}$$

This calculation leaves G(s,τ). At the moment the algorithm is cubic-time because of this term only. For short segments the cost of evaluating this is small, but for long segments it may be burdensome. Let L≥1 be a parameter which essentially governs the maximum segment length for which the sum in equation (31) can be evaluated directly. The present embodiment can use a Chebyshev polynomial approximation to ln(1+x) for 0≤x≤1 and the Clenshaw algorithm to convert this to a regular polynomial, represented in equation (32):

$$\ln(1+x) = \sum_{k=1}^{K} c_k x^k \tag{32}$$

where K=11, accurate to 1×10⁻⁹ throughout the domain [0,1], which is sufficient for present purposes.

Suppose first that $\hat{b}_J$>0, and define $$G<(w,s,\tau) = \begin{cases} \sum_{t=s}^{\tau} f_t \ln(\hat{a}_J + \hat{b}_J(t-w)) & \text{if } s \leq \tau \\ 0 & \text{if } s > \tau \end{cases} \tag{33}$$

$$u = s - 1 + \left\lfloor \frac{\hat{a}_J + \hat{b}_J(s-1-w)}{\hat{b}_J} \right\rfloor$$

so that G(s, τ)=G>(s−1,s,τ), and ⌊•⌋ denotes the floor function. G>(w,s,τ) can be evaluated recursively as follows:

$$G>(w,s,\tau) = H>(w,s,v) + G>(w,v+1,\tau) \tag{34}$$

where if u≤s+L−1 then $$v = \min\{s + L - 1, \tau\}$$

$$H>(w,s,v) = \sum_{t=s}^{v} f_t \ln(\hat{a}_J + \hat{b}_J(t-w))$$

otherwise $$v = \min\{u, \tau\}$$

$$H > (w, s, v) = \sum_{t=s}^{v} f_t \ln\left\{\left[\hat{a}_J + \hat{b}_J(s-1-w)\right] \times \left[1 + \frac{\hat{b}_J(t-s+1)}{\hat{a}_J + \hat{b}_J(s-1-w)}\right]\right\}$$

$$= (F_v^{(0)} - F_{s-1}^{(0)})\ln[\hat{a}_J + \hat{b}_J(s-1-w)] + \sum_{t=s}^{v} f_t \ln(1 + x_t)$$

where $x_t = \hat{b}_J(t-s+1)/(\hat{a} + \hat{b}_J(s-1-w))$. Since $t \leq v \leq u$, the definition of equation (33) guarantees that $0 < x_t \leq 1$. Therefore, the approximation equation (32) can be used together with a standard binomial expansion to obtain equation (35), below.

$$\sum_{t=s}^{v} f_t \ln(1 + x_t) = \sum_{k=1}^{K} C_k \left(\frac{\hat{b}_J}{\hat{a}_J + \hat{b}_J(s-1-w)}\right)^k \times \qquad (35)$$

$$\sum_{r=0}^{k} (-1)^r \binom{k}{r} (s-1)^r \sum_{t=s}^{v} f_t t^{k-r}$$

$$= \sum_{k=1}^{K} C_k \left(\frac{\hat{b}_J}{\hat{a}_J + \hat{b}_J(s-1-w)}\right)^k \times$$

$$\sum_{r=0}^{k} (-1)^r \binom{k}{r} (s-1)^r \left(F_v^{(k-r)} - F_{s-1}^{(k-r)}\right)$$

Although equation (35) involves a sum over 77 terms, there are no function evaluations and empirically it turns out to be faster than the direct evaluation of equation (31) for segment length of 15 (see below).

If $\hat{b}_J < 0$ then the present embodiment proceeds in a similar fashion and only the result will be quoted. Define $$\hat{a}'_J = \hat{a}_J + \hat{b}_J(\tau - s + 2)$$

$$\hat{b}'_J = -\hat{b}_J$$

$$G < (w, s, \tau) = \begin{cases} \sum_{t=s}^{\tau} f_t \ln(\hat{a}'_J + \hat{b}'_J(w-t)) & \text{if } s \leq \tau \\ 0 & \text{if } s > \tau \end{cases}$$

$$u = \tau + 1 - \left\lfloor \frac{\hat{a}'_J + \hat{b}'_J(w-\tau-1)}{\hat{b}'_J} \right\rfloor$$

Then $G(s,\tau) = G<(\tau+1,s,\tau)$, and recursively $$G<(w,s,\tau) = H<(w,v,\tau) + G<(w,s,v-1) \qquad (36)$$

where if $u > \tau - L + 1$ then $$v = \max\{\tau - L + 1, s\}$$

$$H < (w, v, \tau) = \sum_{t=v}^{\tau} f_t \ln(\hat{a}'_J + \hat{b}'_J(w-t))$$

otherwise $$v = \max\{u, s\}$$

$$H < (w, v, \tau) = (F_\tau^{(0)} - F_{v-1}^{(0)})\ln[\hat{a}'_J + \hat{b}'_J(w-\tau-1)] +$$

$$\sum_{k=1}^{K} C_k \left(\frac{\hat{b}'_J}{\hat{a}'_J + \hat{b}'_J(w-\tau-1)}\right)^k \times \sum_{r=0}^{k} (-1)^r \binom{k}{r}(\tau-1)^{k-r}(F_\tau^{(r)} - F_{v-1}^{(r)})$$

Figure 9:
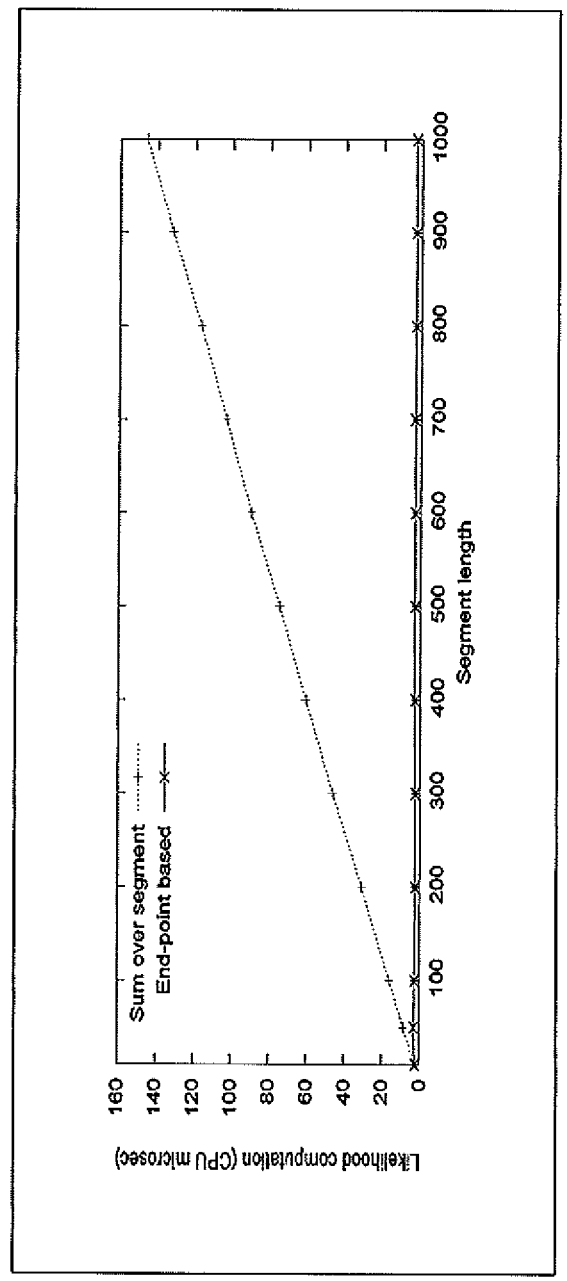
FIG. 9 is an exemplary graph of the likelihood computation time for two exemplary likelihood computation methods, according to the present disclosure.
Figure 10:
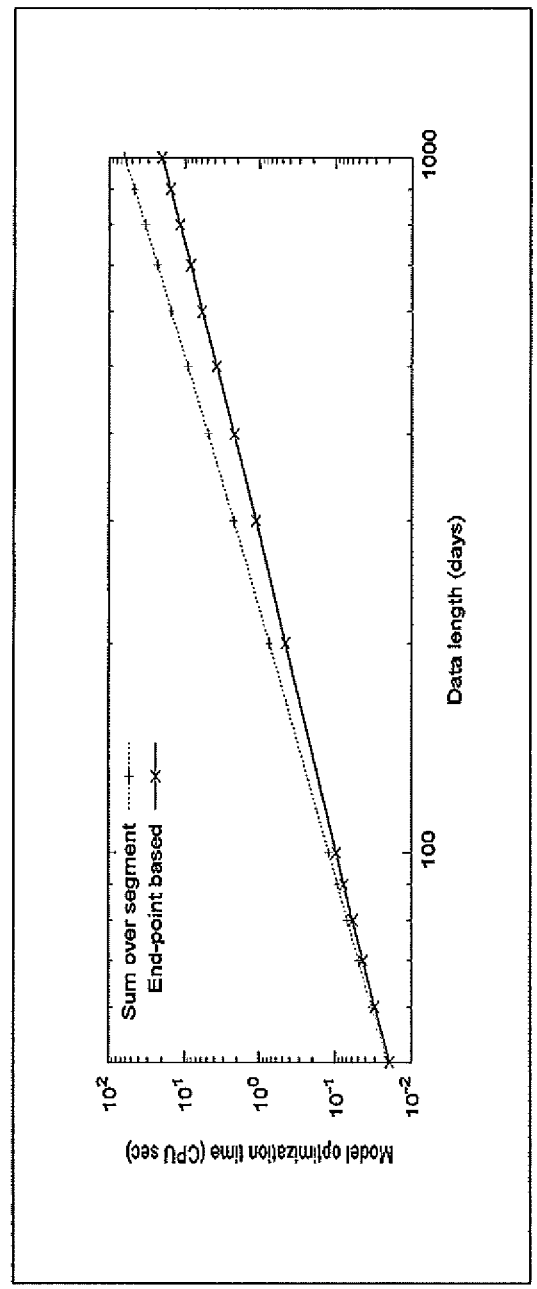
FIG. 10 is an exemplary log-scale plot of the average per-word CPU time to optimize a piecewise-linear model as a function of length of data for two exemplary likelihood computation methods, according to the present disclosure.

Because the number of recursive function calls in equations (34) equation (36) depends on the values of $\hat{a}_J$, $\hat{b}_J$ and not directly on the segment time span (and in practice seldom exceeds 2), this completes a linear-space, quadratic-time formulation. To assess this experimentally the inventors used the Magellan search query corpus. The inventors selected 20 words that occur regularly throughout the corpus (internet, hotel, jobs, free, home, software, music, american, games, email, computer, world, page, school, real, college, state, tv, video, art). FIG. 9 shows the likelihood computation time for both procedures as a function of segment length, using a Linux server with a 3.8 GHz CPU. The end-point based method is faster for segments longer than 15, so the parameter L is set to this value. FIG. 10 is a log-scale plot of the average per-word CPU time to optimize the piecewise-linear model as a function of length of data, for both likelihood computation procedures. The time includes the initial linear step of creating the arrays (a little larger for the end-point based method because there are more of them), as well as the dynamic-programming procedure. Using the end-point based method reduces the overall time by a factor of two for 300 data bins and three for 1000.

Coordinating Changes

A. Step and Burst Events

The change-detection method described in previous sections typically generates a lot of output. For each word/metavalue pair there can be a sequence of change-points connecting piecewise-linear segments. Some of these individual changes can be related to similar ones for many other word/metavalue pairs. It can be undesirable to leave it to a human analyst to have to synthesize more meaningful events out of all these elementary changes.

It is often the case that where a subset of all the change-points for all word/metavalue combinations have a common cause the overall event can be visualized in three exemplary dimensions as follows:
  1) a subset W of words,
  2) a subset M of metavalues,
  3) an interval T of time.

Ideally, precisely synchronized change-points would be found for the Cartesian product of the sets of words and metavalues. However, this is seldom the case in practice. Accordingly, the coordination algorithm can be designed such that it is tolerant of missing word/metavalue combinations and of lack of synchrony (referred to herein below as dis-synchrony) in time.

It can be helpful to consider a new kind of event that can cover several consecutive segments and therefore change-points. Each of these events can have an onset phase, and can also have peak and offset phases. The onset of an event need not consist of a single change-point. The profiles illustrated in FIG. 11 show various possible types of step event, each with an onset phase shown in bold including one or more change-points. Similarly the profiles illustrated in FIG. 12 show various possible types of burst event, each with an offset phase shown in bold in addition to the onset phase. All these examples, except the second and fourth example illustrated in FIG. 12 also have a peak phase where the rate is constant in between the onset and offset The overall change profile for a word/metavalue combination can, in general, include several such events in sequence: zero or more bursts followed by an optional step. An algorithm can post-process the change profiles for each word/metavalue combination and form an overall list of these events in the following exemplary form:

$$\varphi_j \langle w_j, m_j, s_j, e_j, I_j \rangle, j=1, \ldots, N \quad (37)$$

where
$w_j$ is the word,
$m_j$ is the metavalue,
$s_j$ is the start-time,
$e_j$ is the end-time (zero for a step event),
$I_j$ is the interestingness.

Because the onset and offset phases of these events can be extended, the present disclosure can characterize the start-time using the first moment of area of the profile during the onset phase about the point t=0, and similarly for the end-time. The interestingness of the event is based on the quantity defined in section E. If the span of the event $\varphi_j$ consists of the segments $i_1 \leq i \leq i_2$ then define equation (38):

$$I(\phi_j) = \sum_{i=i_1}^{i_2+1} I_{a_{i-1},b_{i-1};a_i,b_i} \quad (38)$$

where $I_{a_{i-1},b_{i-1};a_i,b_i}$ is the measure of interest for segment I compared with the previous segment, as per equation (30). This assigns a measure of interest in a natural way to the entire event.

There are various ways in which the present disclosure can measure the dis-synchrony of two events, for example, $\varphi_i, \varphi_j$. A measure using only $|s_j - s_i| + |e_j - e_i|$ may not be sufficient because of the different forms the onset and offset phases can take, as illustrated above. An abrupt step can get grouped with a long trend. The present embodiment adopts the simple expedient of also incorporating the second moments of area of the onset and offset phases of $\varphi_i$ and $\varphi_j$. The actual definition of the dis-synchrony measure $d(\varphi_i, \varphi_j)$ involves further minor considerations which can be omitted here.

It is logical to separate groups of step events (with $e_j=0$) and of burst events (with $e_j \neq 0$). The principle can be the same in each case. Events of form $\varphi_j$ can form groups when words $w_j$ and metavalues $m_j$ form sets W and M such that the Cartesian product W×̂M is substantially covered with events $\varphi_j$ that are substantially synchronous in time.

B. Graph Clustering

To meet the challenge posed at the end of the previous section, the present disclosure can use a graph clustering method. In testing, the inventors determined that metric clustering algorithms did not work as well as desired because the space occupied by the events $\varphi_j$ is a metric space only in the time dimension. It should be understood, however, that the use of metric clustering algorithms is not precluded.

Figure 13:
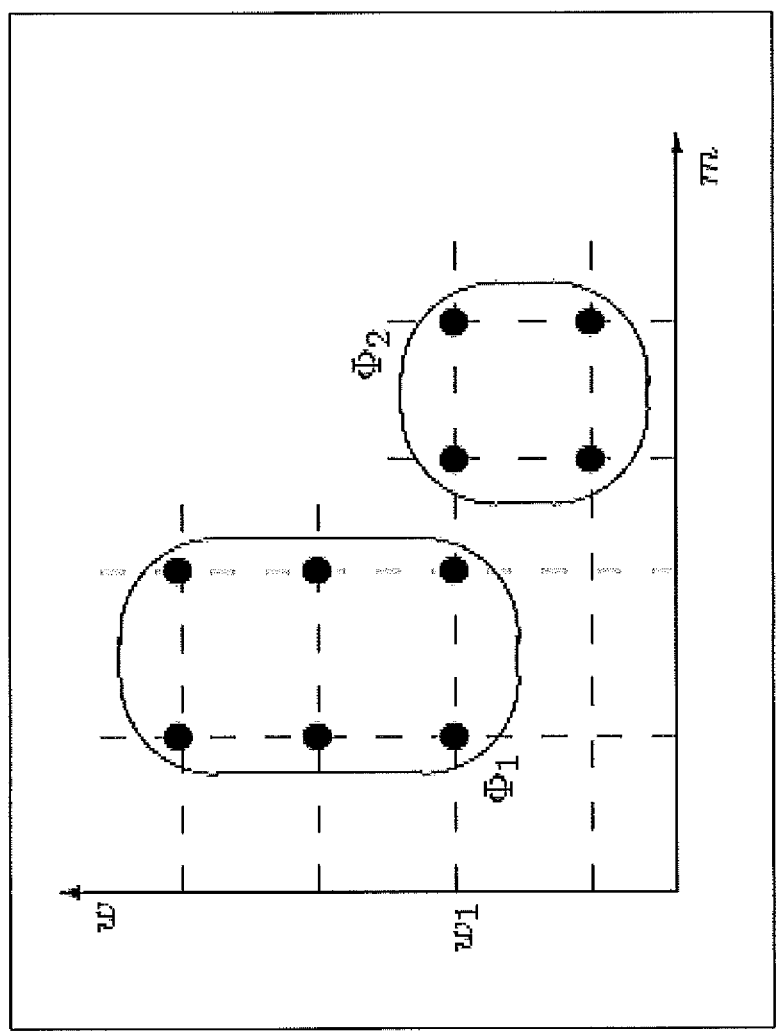
FIG. 13 is an exemplary plot of events on the m-w, plane, according to the present disclosure.

Also, it should be understood that the aforementioned challenge is not a bi-clustering problem, at least in part because it is possible and quite common for words and/or metavalues to be shared between distinct groups of events at different times, and sometimes even for the same times. This is illustrated in FIG. 13. Each ● represents an event $\varphi_j$ in the m-w plane (the time is ignored but the events are assumed to be synchronous). It is natural to form the distinct groups $\Phi_1, \Phi_2$ even though the word $w_1$ is shared.

So the imperative is to cluster the events $\varphi j$ placing emphasis on the Cartesian-product structure across the sets W and M. The present embodiment can accomplish this by creating an undirected graph with the events $\varphi_j$ as nodes. Edges are created between pairs of nodes (for example, $\varphi_i$ and $\varphi_j$) that satisfy one of the following three conditions ($\delta$ is a threshold):

$w_i = w_j$ and $d(\varphi_i, \varphi_j) \leq \delta$ $m_i = m_j$ and $d(\varphi_i, \varphi_j) \leq \delta$ $\exists \varphi_k, \varphi_l$ such that $w_k = w_i$, $m_k = m_j$, $w_l = w_j$, $m_l = m_i$, and $d(\varphi_x, \varphi_y) \leq \delta$ for all x, y∈{i, j, k, l}

Edges therefore exist between nodes that are sufficiently synchronous and that share either the word or the metavalue, or lie across the diagonals of rectangular structures in the m-w plane where all four corners are populated with events that are synchronous as a group (as in FIG. 13). This third condition turns such a structure into a clique in the graph. All edges have weights inversely dependent on $d(\varphi_i, \varphi_j)$.

For clustering the nodes in the graph, the present disclosure can use a procedure that reveals clusters of densely interconnected nodes by simulating a Markov flow along the graph edges.

C. Bigram Check

1) Filtering Graph Edges:

Despite the additional discriminative leverage brought by the metadata, it is still possible that changes can occur for separate words at or about the same time but for different reasons, in which case groups can be generated that are misleading. Data sets without metadata are especially prone to this phenomenon. For this reason, the present embodiment can also perform a bigram check: for a pair of distinct events $\varphi_i, \varphi_j$ such that $w_i \neq w_j$ an edge connecting these events to the graph is only added if the bigram frequency for the pair $w_i, w_j$ exceeds a required threshold that may depend on $w_i$ and $w_j$.

The bigram frequency can be defined as the total frequency of documents containing both $w_i$ and $w_j$ over the range of data concerned. There is no requirement that the words be adjacent or occur in a particular order. Imposing this requirement ensures that the two words co-occur in a sufficient number of the source documents, without regard to metadata. This is an effective filter against spurious combinations. It can be expensive to compute the bigram frequency because it may be impractical to accumulate frequencies for all possible such bigrams during the original binning. A separate pass over the raw data can be implemented for this purpose. Requiring a separate pass can be slow and especially undesirable for the streaming mode, in which case it may be desirable to process all raw data only once.

2) Priority Sampling Scheme:

The present embodiment can resolve the aforementioned challenge by using a priority sampling scheme through which the present embodiment is able to efficiently obtain an estimate for the frequency of an arbitrary bigram post-hoc without the need for a subsequent pass through the raw data. The general principle of priority sampling can be described as follows: Let there be n items i=1, . . . , n with positive weights $v_i$. For each item, define a priority $q_i = v_i / r_i$ where $r_i$ is a uniform random number on [0,1]. The priority sample S of size k<n can include the k items of highest priority. Let $\gamma$ be the k+1st priority, and let $\hat{v}_i = \max\{v_i, \gamma\}$ for each sampled item i∈S. Now consider an arbitrary subset U⊆ {1, ..., n} of the original items. It can be shown that $$E\left[\sum_{i \in U \cap S} \hat{v}_i\right] = \sum_{i \in U} v_i$$

An unbiased estimate of the total weight of the items in the arbitrary subset U is therefore obtained from the priority sample by summing $\hat{v}_i$ for those items that are also in U. This can be done for many different subsets U after forming the priority sample.

The present embodiment employs this for the bigram check in three stages. First, during the binning of the data the present embodiment forms a list of consolidated documents by filtering out stop words and words that are excluded from the final dictionary, then re-assembling each document with the words in word dictionary order. Metadata can be ignored. This enables the documents to merge as far as possible. The total weight $v_i$ of each consolidated document is its total frequency within that bin. From this, the present embodiment can create the priority sample for that bin as described above, and export it along with the word frequency data. In streaming mode, the priority samples are carried forward within the summary file until the data drops off the time horizon.

The second step is to form a merged priority sample for all consolidated documents throughout the data, either from all the separate bins (retrospective mode) or from the summary file together with the latest data (streaming mode). For time and space economy it may be necessary or desirable to discard the tail of the sample for each bin. If this is done, the values of $\hat{v}_i$ can be re-assigned using the revised value of γ, so that unbiasedness is preserved. The final step is to estimate the frequency of an arbitrary bigram for a range of time by summing the values of $\hat{v}_i$ for all the consolidated documents in the merged priority sample that contain that bigram, over that range of time. This can be done very quickly. A threshold can then be applied to the estimated frequencies as described above in order to decide which edges to add to the graph.

There are not expected to be "false positives" with this scheme. If an estimated bigram frequency is greater than zero then the true frequency must also be. However, there is expected to be "false zeros" where the estimated bigram frequency is zero for a bigram that does actually occur. The inventors have measured the true frequencies for these false zeros and found that for a sufficiently large merged priority sample ~$10^5$ the true frequencies are typically very small and below the threshold for acceptance.

D. Output of the Coordination Procedure

The graph clustering forms the nodes (events $\varphi_j$) into groups. From this, the present embodiment can immediately generate a structured output of the following form:

$$\Phi_k = \langle \{\varphi_{k_j}\}_{1 \leq j \leq n_k}, T_k, W_k, M_k, I_k \rangle, k=1,2, \ldots, K$$

sorted in decreasing order of $I_k$, where for each group $\Phi_k$, $\{\varphi_{k_j}\}_{1 \leq j \leq n_k}$ is the set of either step or burst events as appropriate, $T_k$ is the time description,
$W_k = \cup \cup_{j=1}^{n_k} \{w_{k_j}\}$ is the set of words,
$M_k = \cup_{j=1}^{n_k} \{m_{k_j}\}$ is the set of metavalues, and
$I_k = \Sigma_{j=1}^{n_k} I(\varphi_{k_j})$ is the group measure of interest.

The time description $T_k$ can take various forms depending on the type of onset presence and type of offset. The group measure of interest $I_k$ is the total over that for the component events equation (38). All that needs to be presented to the user are the time $T_k$, sets of words $W_k$ and metavalues $M_k$, and perhaps a small sample of the documents or a subset of the priority sample. This is information on a digestible scale which should enable the user to make a judgment about whether this is an important event or not.

Results

A. Corpora

The following description provides some results obtained by applying the aforementioned exemplary CoCITe procedure to various corpora. FIG. 14 summarizes the essential statistics of the corpora. The vocabulary size is the final vocabulary after preselection. There is often a long vocabulary tail of words that do not occur often enough to create a change-point, and these are excluded. The timing information includes model fitting (in retrospective mode) and change-point coordination but excludes text preprocessing and binning. The inventors conducted experiments on a Linux server with a 3.8 GHz CPU.

The time requirements have been found to be roughly proportional to the numbers of words and metavalues and the square of the number of bins. Sparsity also varies from one corpus to another and makes a difference.

B. CHI Scan IVR Analysis

The first corpus consists of logs of human/machine automated dialogs. CHI Scan is a tool for reporting, analysis and diagnosis of interactive voice response (IVR) systems. IVR systems can operate using natural language or directed dialog. Natural language allows a caller to speak naturally. Directed dialog requires a caller to follow a menu which, in some cases, only permits touch-toned responses. Designing, monitoring, testing, and improving all IVR systems is predicated on the availability of tools for data analysis. CHI Scan is a web-based interactive tool for this purpose. In addition to providing both high-level and in-depth views of dialogs between callers and automated systems, CHI scan provides views of changes occurring over time. Changes may be either planned (via a new release of the system) or unplanned.

The CoCITe algorithm can be incorporated into the CHI Scan software framework and like software using the streaming mode. Each document is a complete dialog between a caller and the IVR system. Changes in relative frequencies of the following are tracked:

Prompts: Messages played to the caller
Responses: Callers' choices in response to prompts
Call outcomes: Transfers (to human agents), hang-ups (caller ends the call), and end-calls (system ends the call)
KPIs: Key performance indicators of progress made within the automation.

Figure 15:
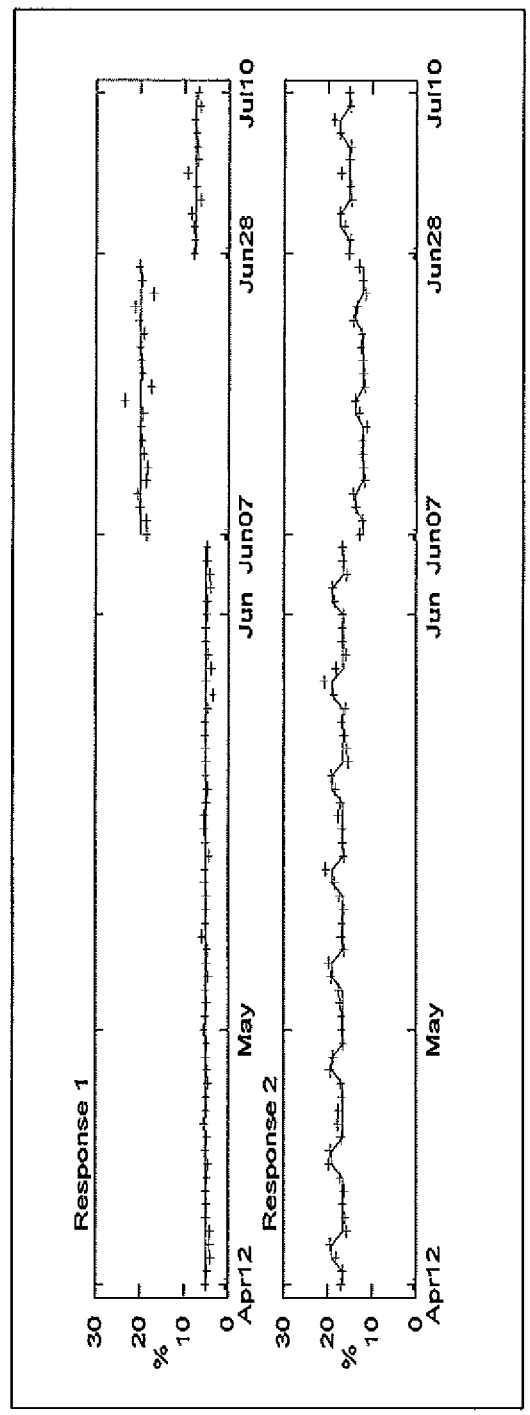
FIG. 15 is an exemplary plot of two of the responses to the initial greeting prompt for an Interactive Voice Response (IVR) application for an electronics company over a 90-day period, according to the present disclosure.
Figure 16:
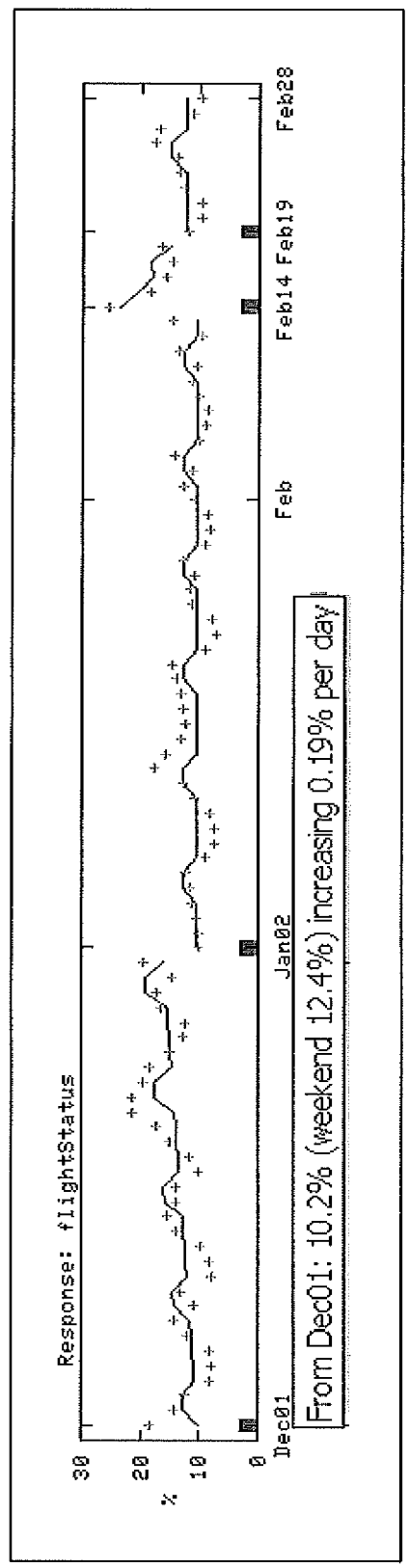
FIG. 16 is an exemplary plot for flight status requests at the initial greeting for an airline application, according to the present disclosure.

These can be important metrics for evaluating and tracking IVR systems over time for providing invaluable insight. No call metadata are used at present for the CoCITe algorithm. However, for tracking the responses the relevant prompt is treated as a metavalue. This has the effect of conditioning each response on a preceding occurrence of the prompt, thereby ensuring that the distribution of responses is normalized. This does not preclude the future use of call metadata as well. Three versions have been implemented, using hourly, daily and weekly binning. FIGS. 15 and 16 illustrate using examples of responses to the initial greeting prompt at the start of each dialog, for two applications using daily binning.

FIG. 15 shows two of the responses to the initial greeting prompt for an IVR application for an electronics company, plotted over a 90-day period. The dots are the actual data and the lines show the fitted segment model. The lower plot of the pair shows a pronounced weekly variation. Two periodic phases are sufficient: weekday and weekend. Both plots show step changes on Jun. 7 and 28, 2007. Because the responses are normalized, if one goes up then others must go down, and the remaining responses (not shown) cover the remainder of the shift in the distribution during that period. An image map on the CHI Scan web page is enabled, so the user can get further details and navigate to particular points just by using the mouse.

FIG. 16 shows a similar plot for "flight status" requests at the initial greeting for an airline application. A regular weekly modulation is superimposed on a four-segment model. The first two segments represent a gradual increasing trend in such requests during the 2006 holiday season, followed by a constant phase through Feb. 14, 2007. On this date there was a snowstorm in the north-eastern United States that caused a burst in requests for flight status that quickly decayed back to the normal level. This phenomenon is captured by the final two segments. The rather noisy signal (sequence of dots) therefore has quite a simple description in terms of the piecewise-linear model with the periodic cycle. There are some finer-grained phenomena that account for the imperfect fit in places, but the threshold settings prevented the fitting of more fragmentary segments. It should be noted that the illustrated plot are tracking relative responses. Events such as the snowstorm often cause an increase in call volume as well as a shift in the distribution of call intents that can be tracked separately.

C. Customer Care Agent Notes

When a customer talks to a human agent, the agent typically makes notes on the reason for the call and the resolution. These notes are a mine of information on why customers are calling, but are usually far too numerous to be read individually. These notes also tend to be rather unstructured, containing many nonstandard abbreviations and spelling errors. However, metadata about the customer are generally available. Detecting and structuring the changes that occur within such streams of notes can provide useful intelligence to the organization. FIG. 17 illustrates notes made during August and September 2005 by customer service representatives talking with domestic residential telecommunications customers. For each note the customer's location is a useful metavalue. In order to avoid splitting the data into too many sub-streams, with consequent loss of power, the state is used. FIG. 17 shows the top ten clusters including start date and the numbers of words and metavalues (states) in each cluster.

Most of the clusters represent routine traffic, but cluster 6 (Hurrican Katrina) is unusual. Customers in the Gulf Coast region who were affected by this disaster had special needs. Many change-points therefore emerge, some involving entirely new words (e.g. Katrina), some involving pre-existing words which increased in frequency (e.g. hurricane), and some involving common words being used in new combinations (e.g. home, destroyed). The coordination procedure groups these changes as follows:

Metavalues: Louisiana, Miss.

Words: hurricane, Katrina, hurrican, house, affected, home, victim, destroyed

The word list shown is a subset. Note the mis-spelling "hurricane," which occurs often enough to be picked up by the procedure. Tracking this event over time we see it gradually tail off during the month of September, 2005.

D. Search Query Data

Queries made to internet search engines can be treated as documents for this analysis. Such queries tend to evolve over time, both cyclically within the 24-hour period, and over a longer time-scale as changing frequency of search terms reflects evolving interest in diverse topics. FIG. 18 illustrates data acquired from the Magellan Voyeur service. This service displayed the last 10 queries to the Magellan search engine, the list being updated every 20 seconds. The list was sampled and archived at 10-minute intervals from 1997 through 2001 (a total of 1.7 million queries containing 0.5 million distinct search terms). There are no metadata because only the query text was revealed. The illustrated results uses both weekly bins for longer-term changes, and daily bins for finer resolution.

Some rather generic terms (e.g. computer, school, jobs, weather) show no change in rate throughout. Some show an increase in frequency (e.g. hotel, Internet, IM), others a decrease (e.g. chatroom, telnet). Many search terms show bursty behavior, and for grouping these in the absence of metadata the bigram check is helpful for forming coherent groups. Some search terms show an increase in frequency at the same time (e.g. Linux and mall in November 1997) but for different reasons, and the bigram check helps to prevent these from being grouped together. Some groups of burst events generated by the coordination procedure are shown in FIG. 18.

Figure 19:
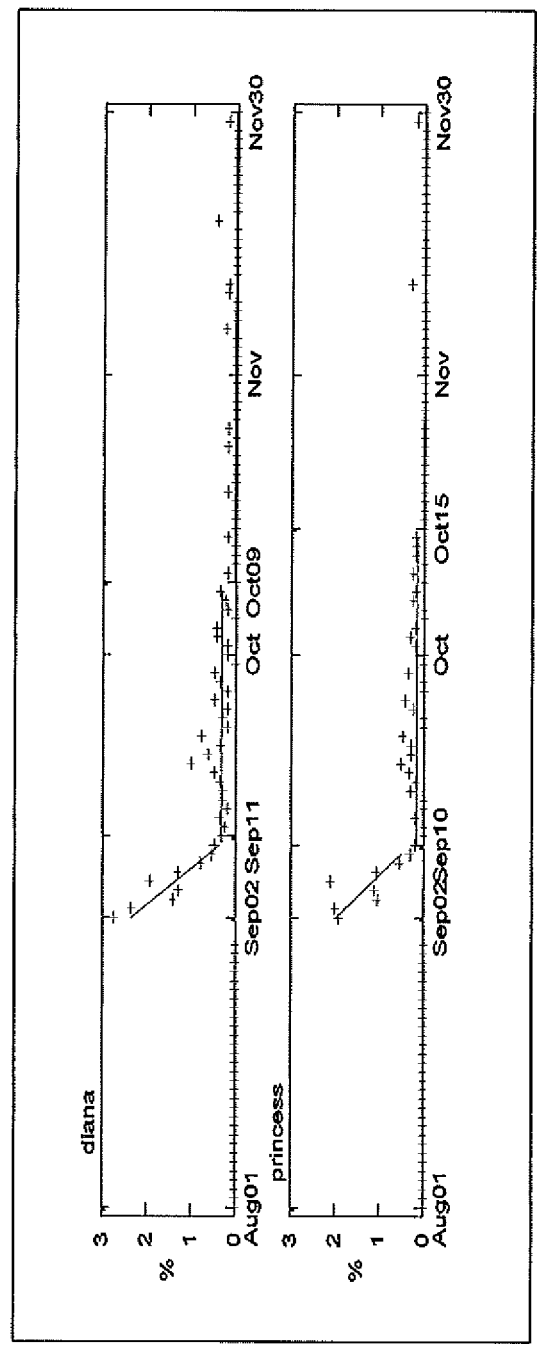
FIG. 19 is an exemplary plot of the profile of the burst event using daily data for the death of Princess Diana, according to the present disclosure.

The profile of the burst event (using daily data) for the death of Princess Diana is shown in FIG. 19. Note that there were no data for $31^{st}$ August (the date of the accident) and 1 Sep. 1997 so the event first appears on $2^{nd}$ September. The initial burst for the word "Diana" is followed by a sharp decline modeled by a linear trend, with a corner on $11^{th}$ September and a further step down on $9^{th}$ October. The profile for the word "princess" is similar. In a situation such as this, an exponential function can be a better model than the piecewise-linear one.

E. Enron Email Corpus

Turning now to FIG. 20. The Enron email dataset consists of roughly 0.5 million messages belonging to a group of 150 users. For our purposes the corpus can be considered a set of time-stamped observations (email messages) along with the meta-variable of document ownership. This data presents a challenge to analysis for a number of reasons. Most importantly, email is readily forwarded, posted to lists, embedded with replies, and other operations which break assumptions of document independence. Direct repetitions of message content are common. This greatly exaggerates topic impact on word-level statistics, as well as leading to the inclusion of non-topical words that happen to be in the initial message and are then copied and recopied. Experiments on automatic foldering of this corpus have revealed similar artifacts.

Thus, change clusters in the full Enron corpus are typically driven by corporate mass mailings (all employees receive a copy) or by targeted advertisements (multiple near-identical messages sent to a particular user). Such effects are valid changes to the language model, but not particularly illuminating as to user activity. To eliminate non-informative "changes" driven by junk mail, we tried various forms of pre-processing. Each user is associated with a number of online identities. We report some results from analysis of messages which have both sender and recipient fields including identities of members of the user group (distinct members, since self-mailings between two accounts are common). Junk email is no longer an issue. Repeated messages still occur; it is difficult to distinguish between identical and near-identical documents (e.g. a copy in the deleted items folder versus a reply with a few new words attached to a copy of the old content). FIG. 20 illustrates the top ten clusters from CoCITe on messages with date-stamps in the year 2000.

Figure 21:
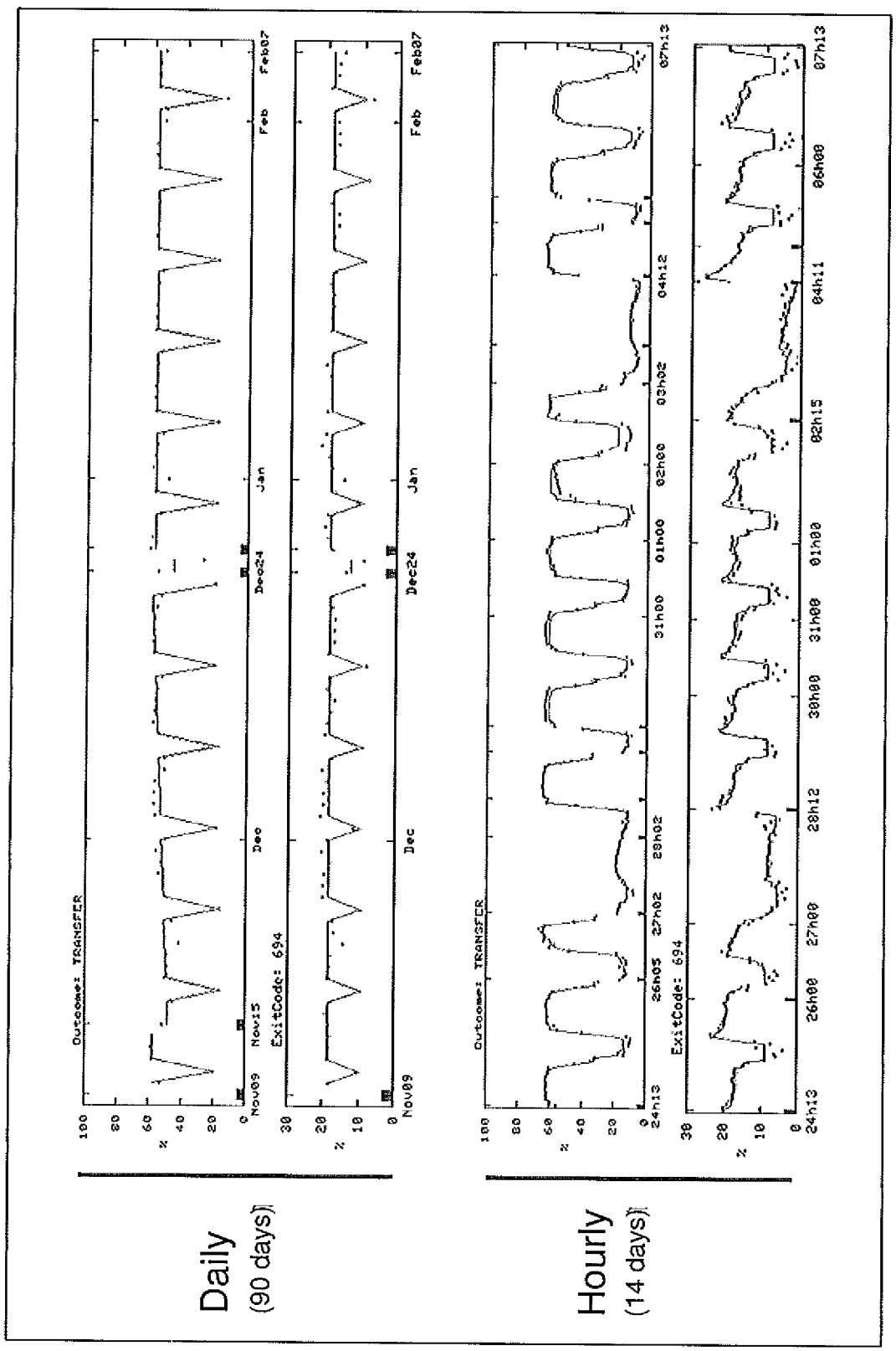
FIG. 21 is an exemplary plot for daily and weekly periodic variation for hourly data acquired from an IVR application, according to the present disclosure.
Figure 22:
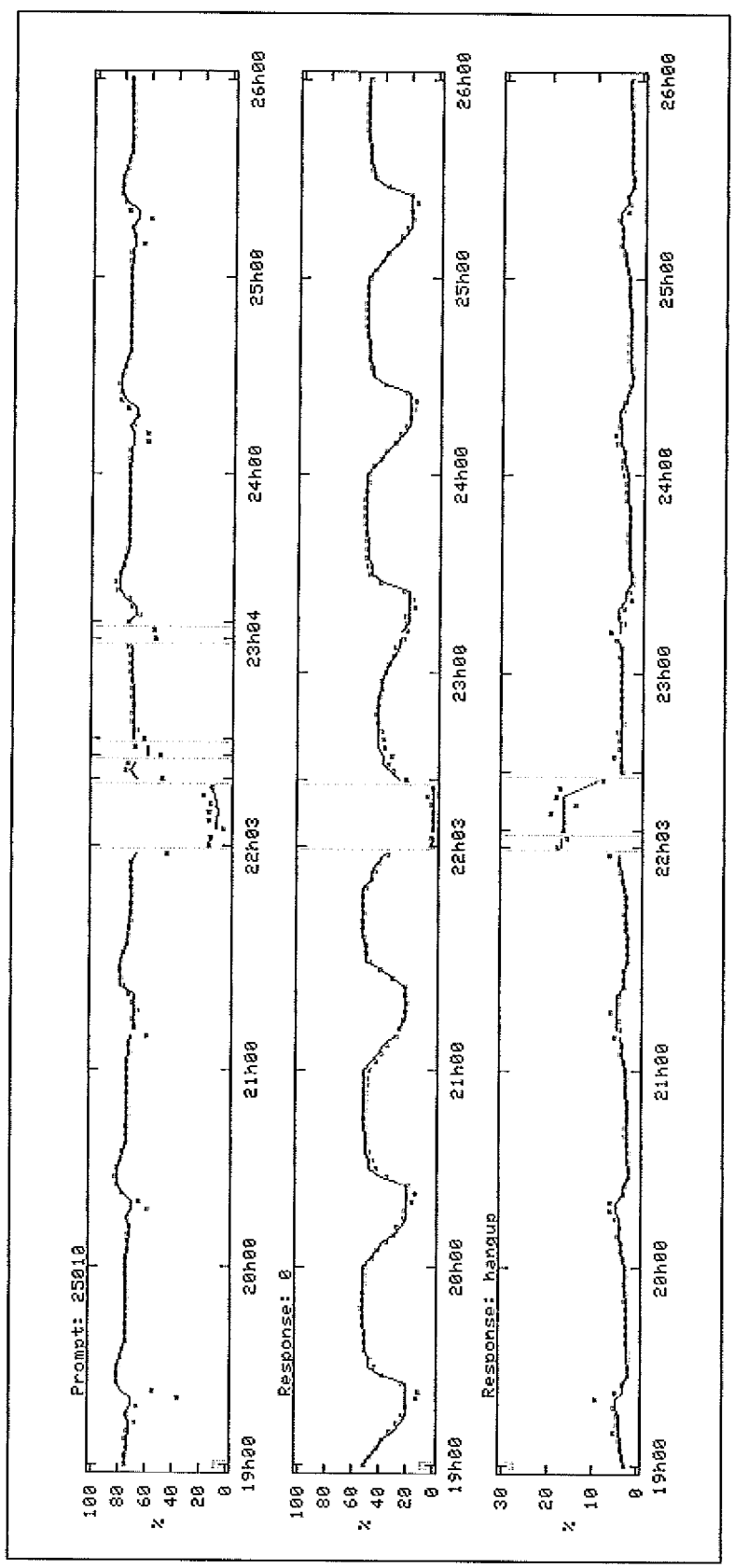
FIG. 22 is an exemplary plot of data acquired from an IVR application, according to the present disclosure.

FIG. 21 is a plot illustrating data received from a customer care IVR. This plot illustrates daily and weekly periodic variation for hourly data over a 90-day period and 14-day period, respectively. In one embodiment used to generate the data illustrated in FIG. 21, the CoCITe tool 202, 302 is used to detect and coordinate patterns within IVR responses. FIG. 22 is a plot illustrating responses received from a customer care IVR during a 7-day period during which incoming callers are prompted with a message, "To pay your bill or get other bill-related options, Press 1. To check your services, Press 2. To get help with services, Press 3. To report a lost or stolen device, Press 4. For Sales, Press 5. For help with other issues including the option to speak with a customer service professional, Press 0. To repeat these options, press *." The illustrated responses are a "0" response requesting the call be transferred to a customer service professional and a hangup response. In one embodiment used to generate the data illustrated in FIG. 22, the CoCITe tool 202, 302 is used to detect and coordinate patterns within IVR responses.

Figure 23:
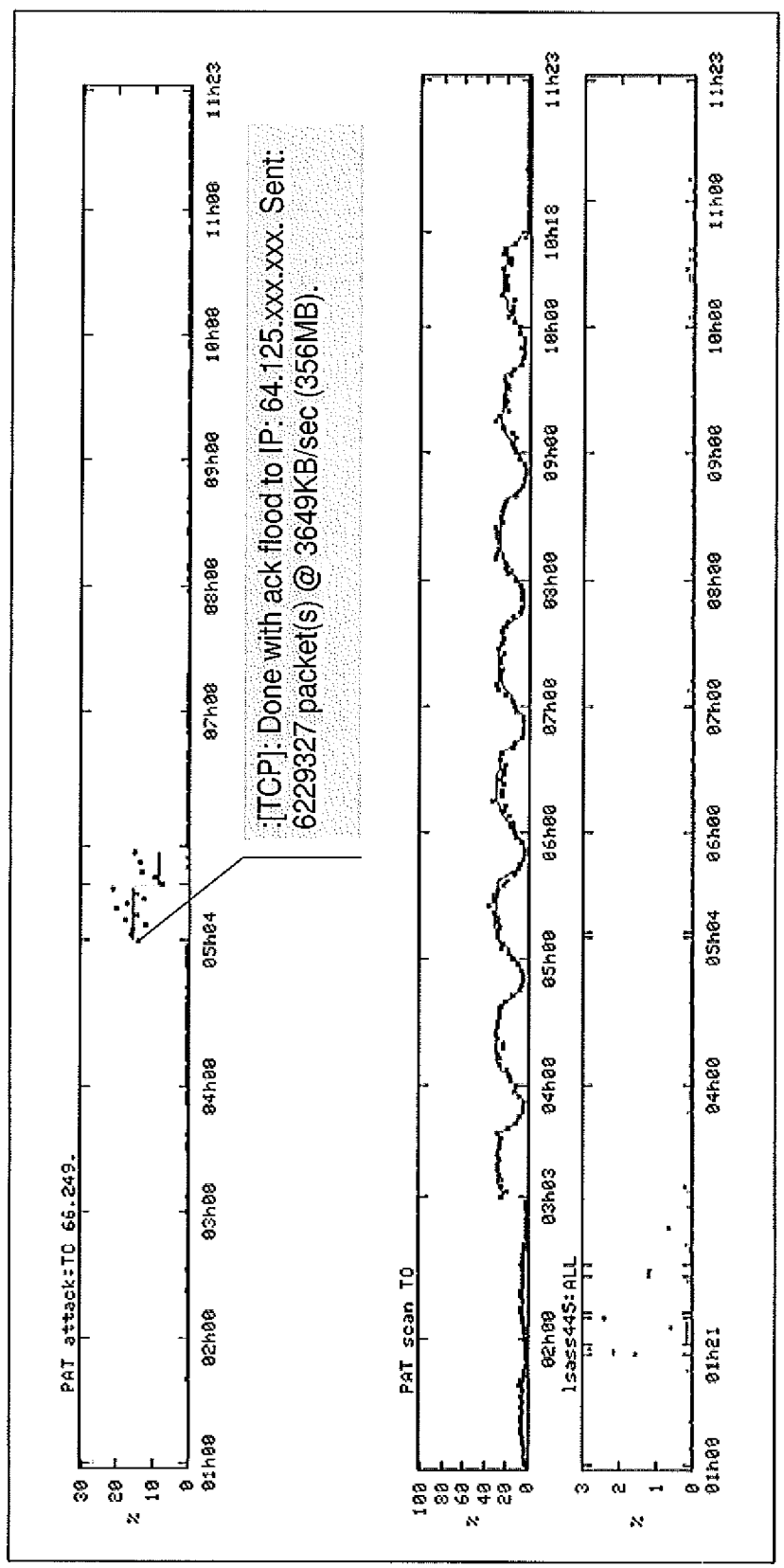
FIG. 23 is an exemplary plot of Botnet activity as detected by an exemplary CoCITe tool, according to the present disclosure.

FIG. 23 is a plot illustrating data received from Botnet activity via an Internet Relay Chat (IRC) channel. In one embodiment used to generate the data illustrated in FIG. 23, the CoCITe tool 202, 302 is used to detect and coordinate patterns within IRC messages that are characteristic of Botnet activity. The illustrated example shows a burst of 556 similar messages from 110 different IP addresses (bots) to a single control distributed denial of service (DDoS) attack on a single target.

CONCLUSION

The present disclosure considers the problem of discovering and coordinating changes occurring within text streams. Typically the volume of text streams being acquired in many domains is far too large for human analysts to process and understand by direct inspection, especially in a timely manner. Therefore, there is a need for tools that can execute change detection and coordination. Changes can be abrupt, gradual, or cyclic. Changes can reverse themselves, and can occur in groups that have a common underlying cause. A tool that is designed to accommodate these behaviors can be of material assistance to analysts in providing them with compact summaries of important patterns of change that would otherwise be hidden in the noise. It is then for the analyst to decide what priority to give to the discovered events.

The above description has described a methodology for efficiently finding step changes, trends, and multi-phase cycles affecting lexical items within streams of text that can be optionally labeled with metadata. Multiple change-points for each lexical item are discovered using a dynamic programming algorithm that ensures optimality. A measure of interestingness has been introduced that weights each change-point by how much information it provides, and complements the more conventional measures of statistical significance. These changes are then grouped across both lexical and metavalue vocabularies in order to summarize the changes that are synchronous in time.

A linear-space, quadratic-time implementation of this methodology is described as a function of the time span of the data and can be applied either retrospectively to a corpus of data or in streaming mode on an ongoing basis. The output of the tool can be a set of ranked events, each including sets of lexical items and metavalues together with a description of the timing of the event. This information, perhaps augmented with a sample of the original documents, can assist a human analyst in understanding an event and its significance.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method comprising:
    applying, by a processor, a first test to change events to determine if the change events are statistically significant, wherein the change events are detected in a data stream based on a probability of occurrence of lexical items in the data stream;
    applying, by the processor, a second test to the change events to determine a measure of interest (I) indicating a probability that the change events are of interest to a user, the second test utilizing conditional mutual information between the lexical items (W) and a lexical occurrence model (M) given a time span (T), wherein the second test is based on a relationship:

$$I(W;M|T)=H(W|T)-H(W|M,T)$$

where H represents conditional entropy; and
    grouping, by the processor, the change events across the lexical items and a metavalue to summarize the change events that are synchronous in time, the grouping forming a set of grouped change events.

2. The method of claim 1, wherein the lexical items in the data stream comprise at least one of: a single word, a symbol, a number, a date, a place, a named-entity, a uniform resource locator, textual data, multimedia data, and a token.

3. The method of claim 1, wherein a metavalue associated with the lexical items includes at least one of external metadata and internal metadata.

4. The method of claim 1, wherein the probability of occurrence of the lexical items in the data stream is monitored over time according to the lexical occurrence model to detect at least one of: a step change, a trend, a cycle, and a burst in the data stream.

5. The method of claim 1, wherein the lexical occurrence model includes at least one of: a piecewise-constant lexical occurrence model and a piecewise-linear lexical occurrence model.

6. The method of claim 1, wherein the lexical occurrence model includes a periodic component to detect cyclic change events and a piecewise-linear component to detect acyclic change events.

7. A non-transitory computer readable storage medium comprising computer readable instructions that; when executed by a processor, cause the processor to perform operations, the operations comprising:
    applying a first test to change events to determine if the change events are statistically significant, wherein the change events are detected in a data stream based on a probability of occurrence of lexical items in the data stream;
    applying a second test to the change events to determine a measure of interest (I) indicating a probability that the change events are of interest to a user, the second test utilizing conditional mutual information between the lexical items (W) and a lexical occurrence model (M) given a time span (T), wherein the second test is based on a relationship:

$$I(W:M|T)=H(W|T)-H(W|M,T)$$

where H represents conditional entropy; and grouping the change events across the lexical items and a metavalue to summarize the change events that are synchronous in time, the grouping forming a set of grouped change events.

8. The non-transitory computer readable storage medium of claim 7, wherein the lexical items in the data stream comprise at least one of: a single word, a symbol, a number, a date, a place, a named-entity, a uniform resource locator, textual data, multimedia data, and a token, and the metavalue associated therewith.

9. The non-transitory computer readable storage medium of claim 7, wherein a metavalue associated with the lexical items includes at least one of: external metadata and internal metadata.

10. The non-transitory computer readable storage medium of claim 7, wherein the operations further comprise monitoring the probability of occurrence of the lexical items in the data stream over time cause the processor to detect at least one of: a step change, a trend, a cycle, and a burst in the data stream.

11. The non-transitory computer readable storage medium of claim 7, wherein the lexical occurrence model includes at least one of: a piecewise-constant lexical occurrence model and a piecewise-linear lexical occurrence model.

12. The non-transitory computer readable storage medium of claim 7, wherein the lexical occurrence model includes a periodic component to detect cyclic change events and a piecewise-linear component to detect acyclic change events.

13. A system comprising:
   at least one processor; and
   at least one memory in communication with the at least one processor, the at least one memory having stored thereon instructions, executable by the at least one processor to cause the at least one processor to perform operations, the operations comprising:
      applying a first test to change events to determine if the change events are statistically significant, wherein the change events are detected in a data stream based on a probability of occurrence of lexical items in the data stream;
      applying a second test to the change events to determine a measure of interest (I) indicating a probability that the change events are of interest to a user, the second test utilizing conditional mutual information between the lexical items (W) and a lexical occurrence model (M) given a time span (T), wherein the second test is based on a relationship:

$$I(W:M|T)=H(W|T)-H(W|M,T)$$

where H represents conditional entropy; and grouping the change events across the lexical items and a metavalue to summarize the change events that are synchronous in time, the grouping forming a set of grouped change events.

14. The system of claim 13, wherein the data stream comprises a text stream, and the lexical items comprise at least one of: a single word, a symbol, a number, a date, a place, a named-entity, a uniform resource locator, textual data, multimedia data, and a token.

15. The system of claim 13, wherein the data stream includes a text stream.

16. The system of claim 13, wherein the lexical occurrence model includes at least one of: a piecewise-constant lexical occurrence model and a piecewise-linear lexical occurrence model.

17. The system of claim 13, wherein the lexical occurrence model includes a periodic component to detect cyclic change events and a piecewise-linear component to detect acyclic change events.

18. The system of claim 13, wherein the operations further comprise monitoring the probability of occurrence of the lexical items in the data stream over time to detect at least one of: a step change, a trend, a cycle, and a burst in the data stream.

* * * * *